(12) United States Patent
Zhang et al.

(10) Patent No.: US 12,405,431 B2
(45) Date of Patent: Sep. 2, 2025

(54) OPTICAL MODULE

(71) Applicant: HISENSE BROADBAND MULTIMEDIA TECHNOLOGIES CO., LTD., Shandong (CN)

(72) Inventors: Honghao Zhang, Shandong (CN); Jiaao Zhang, Shandong (CN); Bin Wang, Shandong (CN); Xujie Huang, Shandong (CN); Shuhua Ye, Shandong (CN); Xueru Liu, Shandong (CN); Qinhao Fu, Shandong (CN); Yifan Xie, Shandong (CN); Yi Tang, Shandong (CN); Benzheng Dong, Shandong (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 273 days.

(21) Appl. No.: 18/122,534

(22) Filed: Mar. 16, 2023

(65) Prior Publication Data

US 2023/0228955 A1  Jul. 20, 2023

Related U.S. Application Data

(63) Continuation-in-part of application No. PCT/CN2020/134054, filed on Dec. 4, 2020.

(30) Foreign Application Priority Data

Sep. 18, 2020 (CN) .......................... 202010988113.2
Sep. 18, 2020 (CN) .......................... 202010988117.0

(Continued)

(51) Int. Cl.
*H04B 10/00* (2013.01)
*G02B 6/42* (2006.01)

(52) U.S. Cl.
CPC ......... *G02B 6/4246* (2013.01); *G02B 6/4281* (2013.01); *G02B 6/4292* (2013.01)

(58) Field of Classification Search
CPC .. G02B 6/4246; G02B 6/4281; G02B 6/4292; G02B 6/29367; G02B 6/4215
See application file for complete search history.

(56) References Cited

U.S. PATENT DOCUMENTS 5,611,006 A * 3/1997 Tabuchi ................. G02B 6/423
                                                        385/35
9,419,717 B2 * 8/2016 Huang ................... H04B 10/40
(Continued)

FOREIGN PATENT DOCUMENTS

CN     102449518 A     5/2012
CN     102681111 A     9/2012
(Continued)

OTHER PUBLICATIONS

Chinese Notification of Grant of Invention Patent Rights in corresponding Chinese Application No. 202010988117.0, dated Sep. 6, 2023, translated, 7 pages.

(Continued)

*Primary Examiner* — Agustin Bello
(74) *Attorney, Agent, or Firm* — MH2 TECHNOLOGY LAW GROUP LLP

(57) ABSTRACT

An optical module includes a light receiving assembly and a first fiber optic adapter. The light receiving assembly includes a first lens group, a plurality of wavelength division demultiplexers and at least one light receiving component. The first lens group is configured to split optical signals transmitted to the first cavity body for a first time according to a wavelength to obtain a first optical signal beam and a second optical signal beam. The plurality of wavelength division demultiplexers include a first wavelength division demultiplexer and a second wavelength division demulti- (Continued)

plexer. The first wavelength division demultiplexer is configured to split the first optical signal beam for a second time according to a wavelength. The second wavelength division demultiplexer is configured to split the second optical signal beam for a second time according to a wavelength. The light receiving component includes a plurality of light receiving chips.

19 Claims, 11 Drawing Sheets

(30) Foreign Application Priority Data

| Sep. 18, 2020 | (CN) | 202010989983.1 |
|---|---|---|
| Sep. 18, 2020 | (CN) | 202010989984.6 |

(56) References Cited

U.S. PATENT DOCUMENTS

| 11,474,311 B1* | 10/2022 | Lin | G02B 6/4214 |
|---|---|---|---|
| 2002/0110313 A1* | 8/2002 | Anigbo | G02B 6/2938 385/47 |
| 2006/0013541 A1* | 1/2006 | Plickert | G02B 6/4246 385/47 |
| 2011/0311229 A1 | 12/2011 | Kondo et al. | |
| 2015/0098127 A1* | 4/2015 | Kurokawa | H04B 10/50 359/484.03 |
| 2015/0104177 A1* | 4/2015 | Kato | H04B 10/40 398/79 |
| 2015/0256259 A1* | 9/2015 | Huang | G02B 6/4261 398/139 |
| 2015/0295658 A1* | 10/2015 | Chen | H04J 14/06 398/43 |
| 2015/0326319 A1* | 11/2015 | Oki | H04B 10/40 398/135 |
| 2016/0047987 A1* | 2/2016 | Du | G02B 6/2773 359/484.05 |
| 2016/0131843 A1* | 5/2016 | Amit | G02B 6/4221 156/60 |
| 2016/0191166 A1* | 6/2016 | Wang | G02B 6/42 398/135 |
| 2017/0269315 A1* | 9/2017 | Yeh | G02B 6/4274 |
| 2018/0003908 A1 | 1/2018 | Jung et al. | |
| 2018/0017745 A1 | 1/2018 | Lin et al. | |
| 2018/0123697 A1* | 5/2018 | Kubota | G02B 27/283 |
| 2019/0103936 A1 | 4/2019 | Kawamura et al. | |
| 2019/0187391 A1* | 6/2019 | Fujimura | H10F 77/407 |
| 2020/0012055 A1* | 1/2020 | Ye | G02B 6/29367 |
| 2020/0014484 A1* | 1/2020 | Chen | H04B 10/2589 |
| 2020/0244364 A1 | 7/2020 | Jin et al. | |
| 2022/0011528 A1* | 1/2022 | Fujimura | G02B 6/4212 |
| 2022/0014272 A1 | 1/2022 | Shin et al. | |
| 2022/0326456 A1* | 10/2022 | Zhang | G02B 6/4292 |
| 2023/0194802 A1* | 6/2023 | Sun | H04B 10/673 385/14 |
| 2023/0228955 A1* | 7/2023 | Zhang | G02B 6/4292 385/93 |
| 2023/0258883 A1* | 8/2023 | Zhang | G02B 6/4284 385/15 |

FOREIGN PATENT DOCUMENTS

| CN | 104503044 A | 4/2015 |
|---|---|---|
| CN | 107046444 A | 8/2017 |
| CN | 107132626 A | 9/2017 |
| CN | 107342817 A | 11/2017 |
| CN | 107402425 A | 11/2017 |
| CN | 206710651 U | 12/2017 |
| CN | 108267821 A | 7/2018 |
| CN | 109407230 A | 3/2019 |
| CN | 109597169 A | 4/2019 |
| CN | 109814201 A | 5/2019 |
| CN | 110376691 A | 10/2019 |
| CN | 110471148 A | 11/2019 |
| CN | 110488433 A | 11/2019 |
| CN | 110858016 A | 3/2020 |
| CN | 210775927 U | 6/2020 |
| JP | 2016170363 A | 9/2016 |
| JP | 2017032731 A | 2/2017 |
| WO | 2018098858 A1 | 6/2018 |
| WO | 2020105779 A1 | 5/2020 |

OTHER PUBLICATIONS

International Search Report and Written Opinion dated Jun. 18, 2021 in corresponding International Application No. PCT/CN2020/134054, translated, 21 pages.
Chinese First Office Action dated Jul. 4, 2022 in corresponding Chinese Application No. 202010988113.2, translated, 14 pages.
Chinese First Office Action dated Jul. 27, 2022 in corresponding Chinese Application No. 202010988117.0, translated, 13 pages.
Chinese Second Office Action dated Mar. 14, 2023 in corresponding Chinese Application No. 202010988117.0, translated, 12 pages.
Chinese First Office Action dated Jul. 25, 2022 in corresponding Chinese Application No. 202010989983.1, translated, 17 pages.
Chinese First Office Action dated Jul. 25, 2022 in corresponding Chinese Application No. 202010989984.6, translated, 17 pages.
Chinese Second Office Action dated Nov. 23, 2022 in corresponding Chinese Application No. 202010989984.6, translated, 22 pages.

* cited by examiner

OPTICAL MODULE

CROSS-REFERENCE TO RELATED APPLICATIONS

This application is a continuation-in-part application of International Patent Application No. PCT/CN2020/134054, filed on Dec. 4, 2020, which claims priorities to Chinese Patent Application No. 202010989984.6, filed on Sep. 18, 2020; Chinese Patent Application No. 202010988117.0, filed on Sep. 18, 2020; Chinese Patent Application No. 202010988113.2, filed on Sep. 18, 2020; and Chinese Patent Application No. 202010989983.1, filed on Sep. 18, 2020, which are incorporated herein by reference in their entireties.

TECHNICAL FIELD

The present disclosure relates to the field of optical communication technologies, and in particular, to an optical module.

BACKGROUND

With the development of new services and application scenarios such as cloud computing, mobile internet, and video, the development and progress of optical communication technology has become increasingly important. In the optical communication technology, an optical module is a tool for achieving interconversion between an optical signal and an electrical signal and is one of the key components in an optical communication device. Moreover, with the development of optical communication technology, it is required that a transmission rate of the optical module is continuously increasing.

SUMMARY

An optical module is provided. The optical module includes a shell, a circuit board, a light receiving assembly, and a first fiber optic adapter. The circuit board is disposed in the shell. The light receiving assembly is disposed in the shell and is electrically connected with the circuit board. The light receiving assembly is configured to convert received optical signals into electrical signals. The fiber optic adapter is connected with the light receiving assembly, and the first fiber optic adapter is configured to transmit optical signals from an outside of the optical module to the light receiving assembly. The light receiving assembly includes a first cavity body, a first lens group, a plurality of wavelength division demultiplexers, and at least one light receiving component. The first cavity body is connected with the first fiber optic adapter. The first lens group is disposed in the first cavity body, and the first lens group is configured to split the optical signals transmitted by the first fiber optic adapter to the first cavity body for a first time according to a wavelength, so as to obtain a first optical signal beam and a second optical signal beam. The plurality of wavelength division demultiplexers are disposed in the first cavity body. The plurality of wavelength division demultiplexers include a first wavelength division demultiplexer and a second wavelength division demultiplexer. The first wavelength division demultiplexer is configured to receive the first optical signal beam and split the first optical signal beam for a second time according to a wavelength. The second wavelength division demultiplexer is configured to receive the second optical signal beam and split the second optical signal beam for a second time according to a wavelength. The at least one light receiving component is disposed in the first cavity body. The light receiving component includes a plurality of light receiving chips. The plurality of light receiving chips are configured to receive the optical signals split for the second time by the plurality of wavelength division demultiplexers and convert the optical signals into the electrical signals.

BRIEF DESCRIPTION OF THE DRAWINGS

In order to describe the technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams but are not limitations on an actual size of a product, an actual process of a method and an actual timing of a signal involved in the embodiments of the present disclosure.

DETAILED DESCRIPTION

Figure 1:
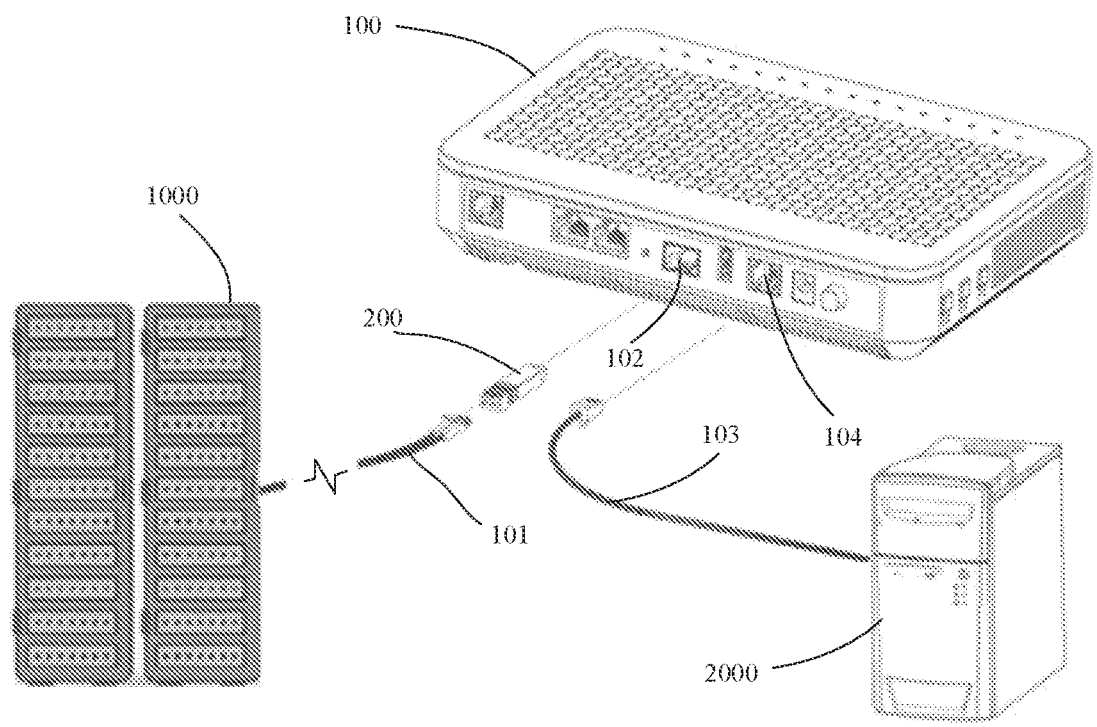
FIG. 1 is a connection diagram of an optical communication system, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are only used for descriptive purposes and are not to be construed as indicating or implying the relative importance or implicitly indicating the number of indicated technical features. Therefore, the feature defined with the term such as "first" or "second" may explicitly or implicitly include one or more of the features. In the description of the embodiments of the present disclosure, the term "a plurality of" or "the plurality of" means two or more unless otherwise specified.

In the description of some embodiments, the term "connected" and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

The term such as "about," "substantially," or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and the error associated with the measurement of a particular quantity (i.e., the limitation of a measurement system).

In optical communication technologies, light is used to carry information to be transmitted, and an optical signal carrying the information is transmitted to an information processing device such as a computer through an information transmission device such as an optical fiber or an optical waveguide, so as to achieve transmission of the information. Since an optical signal has a characteristic of passive transmission when being transmitted through the optical fiber or the optical waveguide, low-cost and low-loss information transmission may be achieved. In addition, a signal transmitted by the information transmission device such as the optical fiber or the optical waveguide is an optical signal, while a signal that can be recognized and processed by the information processing device such as the computer is an electrical signal. Therefore, in order to establish information connection between the information transmission device such as the optical fiber or the optical waveguide and the information processing device such as the computer, it is necessary to achieve interconversion between the electrical signal and the optical signal.

An optical module implements the interconversion between the optical signal and the electrical signal in the field of optical fiber communication technologies. The optical module includes an optical port and an electrical port. The optical module achieves optical communication with the information transmission device such as the optical fiber or the optical waveguide through the optical port and achieves electrical connection with an optical network terminal (e.g., an optical modem) through the electrical port. The electrical connection is mainly used for achieving power supply, transmission of an inter-integrated circuit (I2C) signal, transmission of data signal, and grounding. The optical network terminal transmits an electric signal to the information processing device such as the computer through a network cable or a wireless fidelity (Wi-Fi) technology.

FIG. 1 is a connection diagram of an optical communication system, in accordance with some embodiments. As shown in FIG. 1, an optical communication system mainly includes a remote server 1000, a local information processing device 2000, an optical network terminal 100, an optical module 200, an optical fiber 101, and a network cable 103.

An end of the optical fiber 101 is connected to the remote server 1000, and the other end of the optical fiber 101 is connected to the optical network terminal 100 through the optical module 200. The optical fiber itself can support long-distance signal transmission such as several-kilometer (6-kilometer to 8-kilometer) signal transmission. On this basis, ultra-long-distance transmission may be achieved theoretically if a repeater is used. Therefore, in a typical optical communication system, a distance between the remote server 1000 and the optical network terminal 100 may typically reach several kilometers, tens of kilometers, or hundreds of kilometers.

An end of the network cable 103 is connected to the local information processing device 2000, and the other end of the network cable 103 is connected to the optical network terminal 100. The local information processing device 2000 may include any or more of the following devices: a router, a switch, a computer, a mobile phone, a tablet computer, a television, or the like.

A physical distance between the remote server 1000 and the optical network terminal 100 is greater than a physical distance between the local information processing device 2000 and the optical network terminal 100. Connection between the local information processing device 2000 and the remote server 1000 is accomplished by the optical fiber 101 and the network cable 103, and connection between the optical fiber 101 and the network cable 103 is accomplished by the optical module 200 and the optical network terminal 100.

The optical network terminal 100 includes a housing in a substantially cuboid shape, and an optical module interface 102 and a network cable interface 104 that are disposed on the housing. The optical module interface 102 is configured to be connected to the optical module 200, so that bidirectional electrical signal connection is established between the optical network terminal 100 and the optical module 200. The network cable interface 104 is configured to be connected to the network cable 103, so that bidirectional electrical signal connection is established between the optical network terminal 100 and the network cable 103. Connection between the optical module 200 and the network cable 103 is established by the optical network terminal 100. For example, the optical network terminal 100 transmits electrical signals from the optical module 200 to the network cable 103 and transmits electrical signals from the network cable 103 to the optical module 200. Therefore, the optical network terminal 100, as a master monitor of the optical module 200, can monitor the operation of the optical module 200. In addition to the optical network terminal 100, the master monitor of the optical module 200 may further include an optical line terminal (OLT).

The optical module 200 includes an optical port and an electrical port. The optical port is configured to be connected to the optical fiber 101, so that bidirectional optical signal connection is established between the optical module 200 and the optical fiber 101. The electrical port is configured to be connected to the optical network terminal 100, so that bidirectional electrical signal connection is established between the optical module 200 and the optical network terminal 100. The interconversion between the optical signal and the electrical signal is achieved by the optical module 200, so that connection is established between the optical fiber 101 and the optical network terminal 100. For example, optical signals from the optical fiber 101 are converted into electrical signals by the optical module 200, and then the electrical signals are input into the optical network terminal 100. Electrical signals from the optical network terminal 100 are converted into optical signals by the optical module 200, and then the optical signal are input into the optical fiber 101. Since the optical module 200 is a tool for achieving interconversion between the optical signal and the electrical signal and has no function of processing data, information does not change in the above photoelectric conversion process.

A bidirectional signal transmission channel is established between the remote server 1000 and the local information processing device 2000 by the optical fiber 101, the optical module 200, the optical network terminal 100, and the network cable 103.

Figure 2:
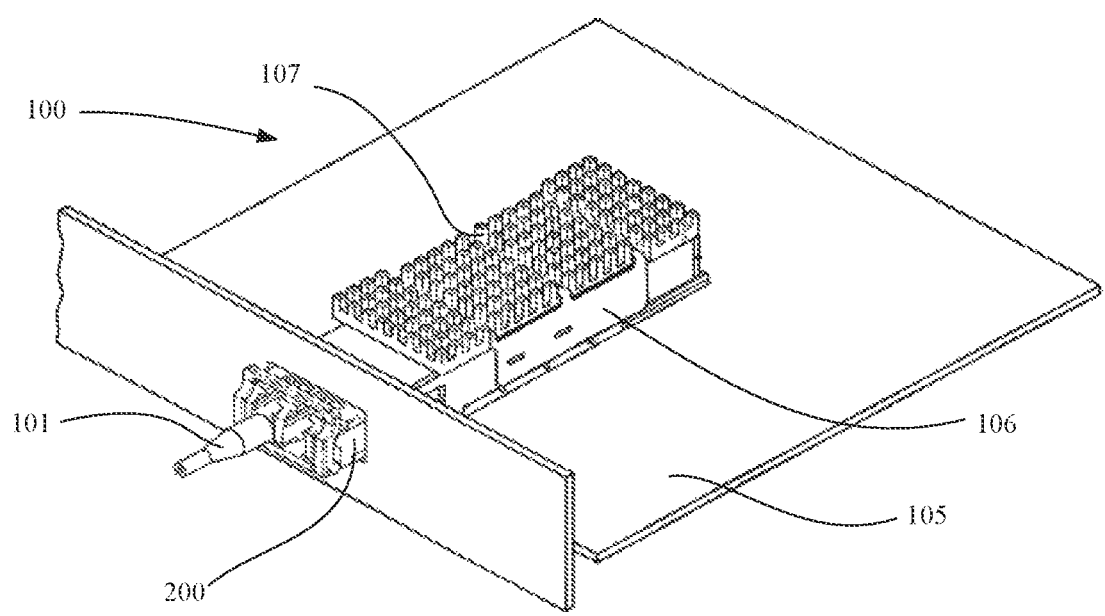
FIG. 2 is a diagram showing a structure of an optical network terminal, in accordance with some embodiments.

FIG. 2 is a diagram showing a structure of an optical network terminal, in accordance with some embodiments. In order to clearly show a connection relationship between the optical module 200 and the optical network terminal 100, FIG. 2 shows only a structure of the optical network terminal 100 related to the optical module 200. As shown in FIG. 2, the optical network terminal 100 further includes a PCB circuit board 105 disposed in the housing, a cage 106 disposed on a surface of the PCB circuit board 105, a heat sink 107 disposed on the cage 106, and an electrical connector disposed inside the cage 106. The electrical connector is configured to be connected to the electrical port of the optical module 200; and the heat sink 107 has protruding structures such as fins for increasing a heat dissipation area.

The optical module 200 is inserted into the cage 106 of the optical network terminal 100 and is fixed by the cage 106. Heat generated by the optical module 200 is conducted to the cage 106 and is then diffused by the heat sink 107. After the optical module 200 is inserted into the cage 106, the electrical port of the optical module 200 is connected to the electrical connector inside the cage 106, so that the bidirectional electrical signal connection is established between the optical module 200 and the optical network terminal 100. In addition, the optical port of the optical module 200 is connected to the optical fiber 101, so that the bidirectional optical signal connection is established between the optical module 200 and the optical fiber 101.

Figure 3:
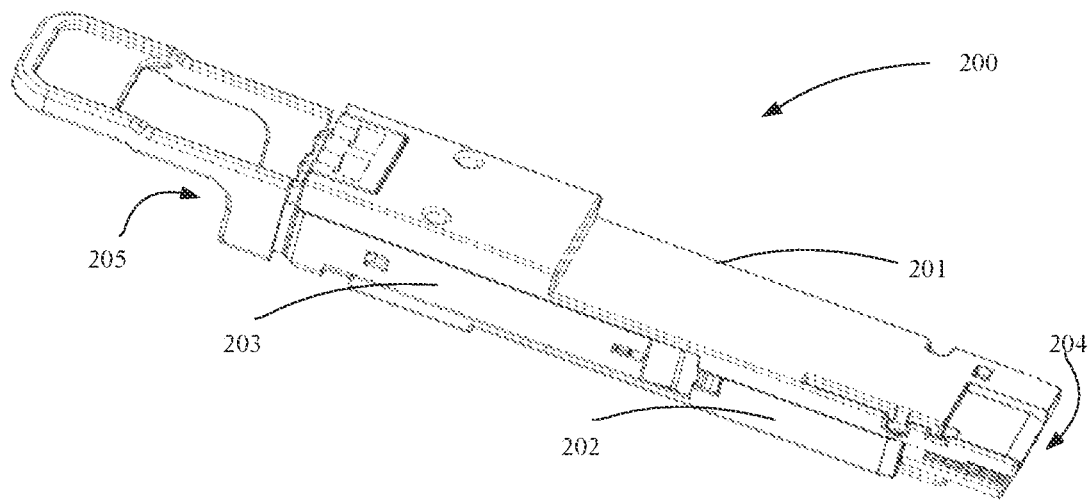
FIG. 3 is a diagram showing a structure of an optical module, in accordance with some embodiments.
Figure 4:
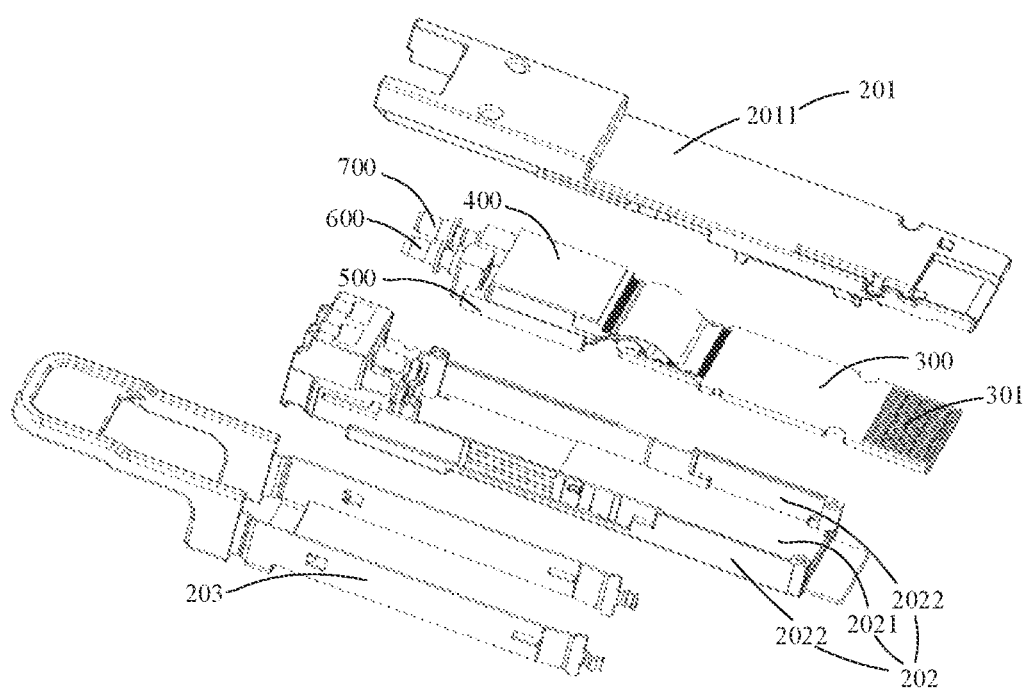
FIG. 4 is an exploded view of an optical module, in accordance with some embodiments.

FIG. 3 is a diagram showing a structure of an optical module, in accordance with some embodiments. FIG. 4 is an exploded view of an optical module, in accordance with some embodiments. As shown in FIGS. 3 and 4, the optical module 200 includes a shell, and a circuit board 300, a light emitting assembly 400, and a light receiving assembly 500 that are disposed inside the shell. However, the present disclosure is not limited thereto. In some embodiments, the optical module 200 includes one of the light emitting assembly 400 and the light receiving assembly 500.

The shell includes an upper shell 201 and a lower shell 202. The upper shell 201 covers the lower shell 202 to form the shell with two openings 204 and 205, and an outer contour of the shell is generally in a shape of a cuboid.

In some embodiments, the lower shell 202 includes a bottom plate 2021 and two lower side plates 2022 that are located on two sides of the bottom plate 2021 respectively and disposed perpendicular to the bottom plate 2021: the upper shell 201 includes a cover plate 2011, and the cover plate 2011 covers the two lower side plates 2022 of the lower shell 202 to form the shell.

In some embodiments, the lower shell 202 includes a bottom plate 2021 and two lower side plates 2022 that are located on two sides of the bottom plate 2021 respectively and disposed perpendicular to the bottom plate 2021; the upper shell 201 includes a cover plate 2011 and two upper side plates that are located on two sides of the cover plate respectively and disposed perpendicular to the cover plate 2011. The two upper side plates are combined with the two lower side plates 2022, so that the upper shell 201 covers the lower shell 202.

A direction in which a connecting line between the two openings 204 and 205 extends may or may not be the same as a length direction of the optical module 200. For example, the opening 204 is located at an end (the right end in FIG. 3) of the optical module 200, and the opening 205 is also located at an end (the left end in FIG. 3) of the optical module 200. Alternatively, the opening 204 is located at an end of the optical module 200, while the opening 205 is located at a side of the optical module 200. The opening 204 is the electrical port, and a connecting finger 301 of the circuit board 300 extends from the electrical port 204, and is inserted into the master monitor (e.g., the optical network terminal 100). The opening 205 is the optical port and is configured to be connected to the external optical fiber 101, so that the optical fiber 101 is connected to the light emitting assembly 400 and the light receiving assembly 500 in the optical module 200.

With help of an assembly manner of combining the upper shell 201 with the lower shell 202, it is helpful to install components such as the circuit board 300, the light emitting assembly 400, and the light receiving assembly 500 into the shell, and these components may be encapsulated and protected by the upper shell 201 and the lower shell 202. In addition, during assembly of the components such as the circuit board 300, the light emitting assembly 400, and the light receiving assembly 500, it is also helpful to arrange positioning elements, heat dissipation elements, and electromagnetic shielding elements of these components, which facilitates automated implementation of production.

In some embodiments, the upper shell 201 and the lower shell 202 are made of a metallic material, which facilitates electromagnetic shielding and heat dissipation.

In some embodiments, the optical module 200 further includes an unlocking component 203 located outside the shell thereof. The unlocking component 203 is configured to implement or release fixed connection between the optical module 200 and the master monitor.

For example, the unlocking component 203 is located outside the two lower side plates 2022 of the lower shell 202 and includes an engagement component that is matched with a cage of the master monitor (e.g., the cage 106 of the optical network terminal 100). When the optical module 200 is inserted into the cage 106, the optical module 200 is fixed in the cage 106 by the engagement component of the unlocking component 203. When the unlocking component 203 is pulled, the engagement component of the unlocking component 203 moves with the pulling, and then a connection relationship between the engagement component and the master monitor is changed to release an engagement relationship between the optical module 200 and the master monitor, so that the optical module 200 may be drawn out of the cage 106.

The circuit board 300 includes circuit wires, electronic elements, and chips. The electronic elements and the chips are connected together by the circuit wires according to a circuit design, so as to achieve functions such as power supply, electrical signal transmission, and grounding. The electronic elements may include, for example, a capacitor, a resistor, a triode, and a metal-oxide-semiconductor field-effect transistor (MOSFET). The chips may include, for example, a microcontroller unit (MCU), a laser driver chip, a transimpedance amplifier (TIA), a limiting amplifier, a clock and data recovery (CDR) chip, a power management chip, or a digital signal processing (DSP) chip.

The circuit board 300 is generally a rigid circuit board, and the rigid circuit board may also achieve a bearing function due to its relatively hard material. For example, the rigid circuit board may stably bear the electronic elements and the chips. The rigid circuit board may also be inserted into an electrical connector inside the cage of the master monitor.

The circuit board 300 further includes the connecting finger 301 formed on a surface of the end thereof, and the connecting finger 301 is composed of a plurality of pins independent of each other. The circuit board 300 is inserted into the cage 106 and is conductively connected to the electrical connector inside the cage 106 through the connecting finger 301. The connecting finger 301 may be disposed on only a surface (e.g., the upper surface shown in FIG. 4) of the circuit board 300 or may be disposed on both upper and lower surfaces of the circuit board 300 to adapt to an occasion with a demand for a large number of pins. The connecting finger 301 is configured to establish electrical connection with the master monitor, so as to achieve power supply, grounding, transmission of I2C signals, and transmission of data signals. Of course, flexible circuit boards are also used in some optical modules. A flexible circuit board is generally used in conjunction with a rigid circuit board as a supplement for the rigid circuit board.

In some embodiments, the light emitting assembly 400 and the light receiving assembly 500 are located on a side of the circuit board 300 away from the connecting finger 301, and the light emitting assembly 400 and the light receiving assembly 500 are arranged in a stack (e.g., stacked one on top of the other). For example, as shown in FIG. 4, the light emitting assembly 400 is disposed on a side of the light receiving assembly 500 proximate to the upper shell 201. That is to say, the light emitting assembly 400 is closer to the upper shell 201 than the light receiving assembly 500. Alternatively, the light emitting assembly 400 is disposed on a side of the light receiving assembly 500 away from the upper shell 201. That is to say, the light emitting assembly 400 is farther from the upper shell 201 than the light receiving assembly 500.

In a case where the light emitting assembly 400 is closer to the upper shell 201 than the light receiving assembly 500, the lower shell 202 may directly support the light receiving assembly 500, and the light receiving assembly 500 supports the light emitting assembly 400. Of course, in some embodiments, the lower shell 202 may also support the light receiving assembly 500 through a cushion block.

In some embodiments, the light emitting assembly 400 and the light receiving assembly 500 are physically separated from the circuit board 300, and each are electrically connected to the circuit board 300 through a corresponding flexible circuit board or electrical connecting member. Since the light emitting assembly 400 and the light receiving assembly 500 each have a large volume and cannot be disposed on the circuit board 300, the light emitting assembly 400 and the light receiving assembly 500 are disposed separately from the circuit board 300 and are electrically connected to the circuit board 300 through the flexible circuit board or the electrical connecting member.

Figure 5:
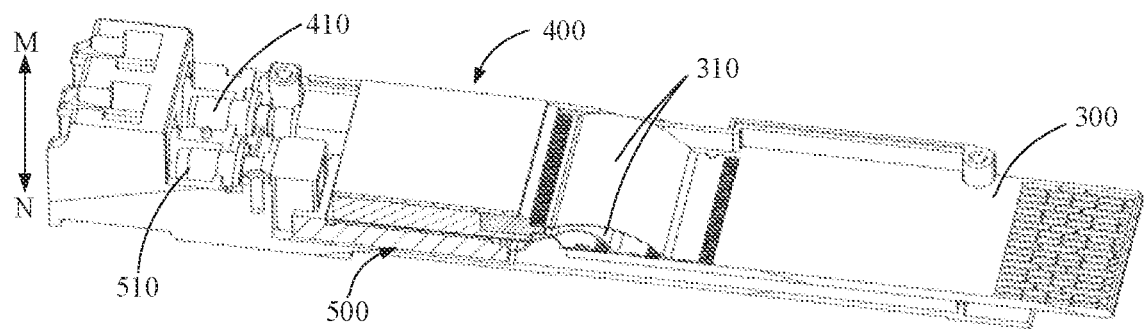
FIG. 5 is a sectional view of an optical module, in accordance with some embodiments.

FIG. 5 is a sectional view of an optical module, in accordance with some embodiments. As shown in FIG. 5, the optical module 200 further includes a first fiber optic adapter 510 and a second fiber optic adapter 410. The second fiber optic adapter 410 is disposed at an end of the light emitting assembly 400 away from the circuit board 300, and the second fiber optic adapter 410 is connected to the light emitting assembly 400. The second fiber optic adapter 410 is configured to transmit an optical signal from the light emitting assembly 400 to the outside of the optical module 200. The first fiber optic adapter 510 is disposed at an end of the light receiving assembly 500 away from the circuit board 300, and the first fiber optic adapter 510 is connected to the light receiving assembly 500. The first fiber optic adapter 510 is configured to transmit an optical signal from the outside of the optical module 200 to the light receiving assembly 500.

As shown in FIG. 5, the second fiber optic adapter 410 and the first fiber optic adapter 510 are located at a same height in a height direction (e.g., the MN direction) of the optical module 200. The second fiber optic adapter 410 and the first fiber optic adapter 510 are connected to optical fiber connectors outside the optical module 200, respectively. Since the optical fiber connector is a standard part, and a shape and size of the optical fiber connector limit positions of the two fiber optic adapters of the optical module 200, it is required that the second fiber optic adapter 410 and the first fiber optic adapter 510 are disposed at the same height.

Figure 6:
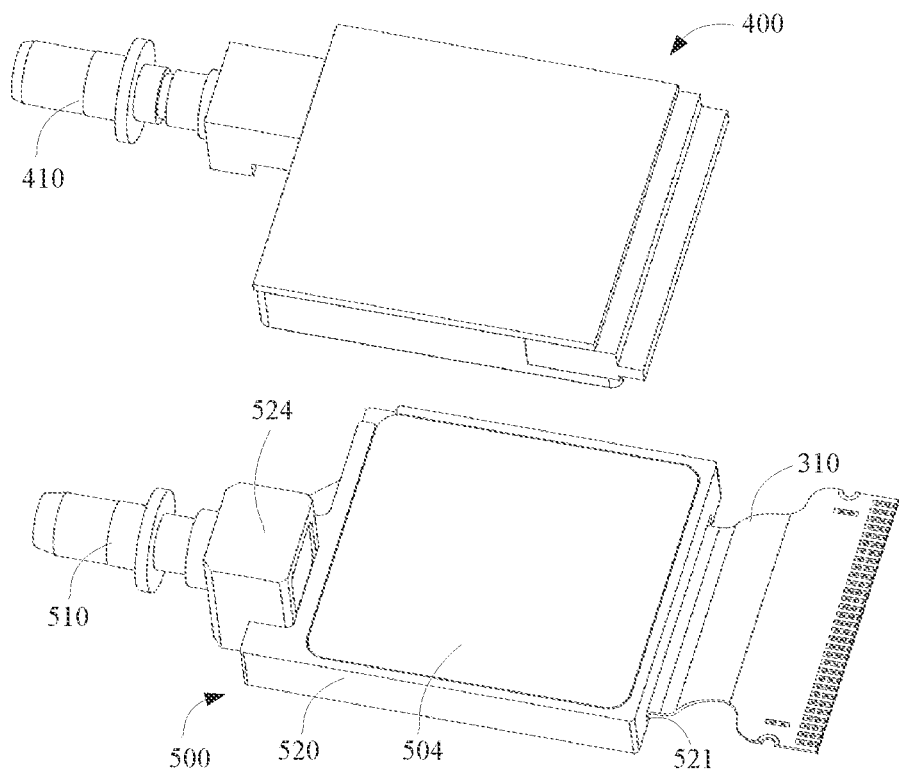
FIG. 6 is an exploded view of a light emitting assembly and a light receiving assembly, in accordance with some embodiments.
Figure 7:
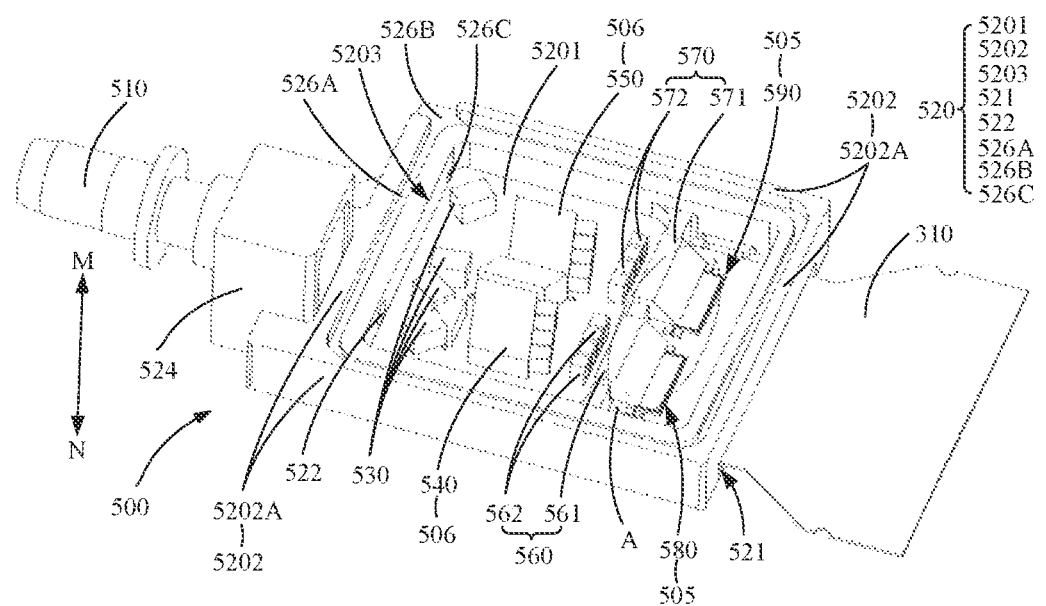
FIG. 7 is a diagram showing a structure of a light receiving assembly without a first cover plate, in accordance with some embodiments.
Figure 8:
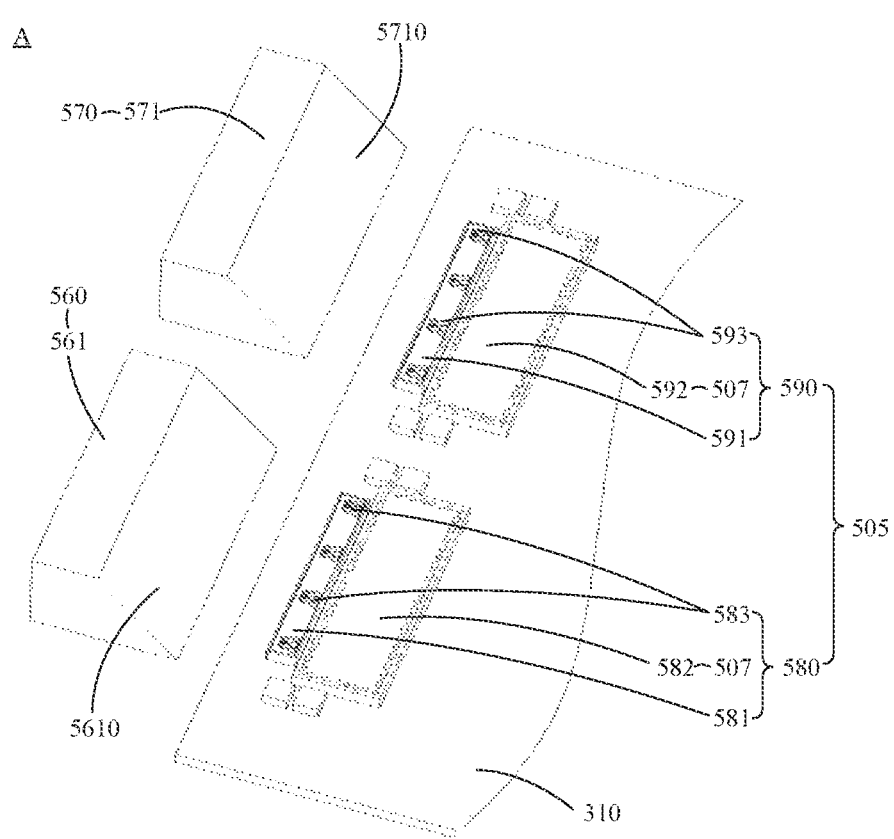
FIG. 8 is a partial enlarged view of the circle A in FIG. 7.

FIG. 6 is an exploded view of a light emitting assembly and a light receiving assembly, in accordance with some embodiments. FIG. 7 is a diagram showing a structure of a light receiving assembly without a first cover plate, in accordance with some embodiments. FIG. 8 is a partial enlarged view of the circle A in FIG. 7.

In some embodiments, as shown in FIGS. 6 and 7, the light receiving assembly 500 includes a first cavity body 520, a first cover plate 504, and a light receiving component 505. For example, as shown in FIG. 7, the first cavity body 520 includes a base 5201, a side wall 5202, and a cavity 5203. The side wall 5202 is arranged around the base 5201, and the base 5201 and the side wall 5202 jointly define the cavity 5203. The cavity 5203 is configured to accommodate optical components (e.g., lenses) and a light receiving component 505 (e.g., an electrical element such as a light receiving chip or a transimpedance amplifier) in the light receiving assembly 500. The first cover plate 504 covers the first cavity body 520 to close the cavity 5203.

An end of the first cavity body 520 is connected to the first fiber optic adapter 510, so as to receive the optical signal from the outside of the optical module 200 through the first fiber optic adapter 510 and transmit the received optical signal to the light receiving component 505 through the optical components disposed in the first cavity body 520.

For example, as shown in FIG. 7, the base 5201 is in a shape of a rectangle, and the side wall 5202 includes four side sub-walls 5202A connected in sequence. The first cavity body 520 further includes a first via hole 522 and a first opening 521. The first via hole 522 and the first opening 521 are disposed on two opposite side sub-walls 5202A of the four side sub-walls 5202A, respectively. The first via hole 522 is proximate to the first fiber optic adapter 510 and communicates with the cavity 5203. The first fiber optic adapter 510 is connected to the first cavity body 520 through the first via hole 522. The first opening 521 is proximate to the circuit board 300, and the first opening 521 penetrates a corresponding side sub-wall 5202A and communicates with the cavity 5203. The optical module 200 further includes a flexible circuit board 310, and the flexible circuit board 310 is inserted into the cavity 5203 through the first opening 521. An end of the flexible circuit board 310 is inserted into the first opening 521 and fixed in the cavity 5203, and the other end of the flexible circuit board 310 is electrically connected with the circuit board 300. For example, the end of the flexible circuit board 310 is electrically connected with the light receiving component 505.

Of course, in some embodiments, the light receiving component 505 in the first cavity body 520 may also be connected to the circuit board 300 through an electrical connecting member (e.g., a metallized circuit board composed of multiple layers). For example, the optical module 200 further includes the electrical connecting member. The electrical connecting member passes through the first opening 521 and is electrically connected with the light receiving component 505. The electrical connecting member is connected with the circuit board 300 through the flexible circuit board 310. so as to achieve electrical connection between the circuit board 300 and the light receiving assembly 500.

In some embodiments, the first cavity body 520 and the first cover plate 504 may be made of a metal material. For example, the first cavity body 520 and the first cover plate 504 are metal members processed by die casting and milling.

In the optical module 200 provided by some embodiments of the present disclosure, the light receiving assembly 500 is configured to receive a plurality of optical signals with different wavelengths and split the plurality of optical signals with different wavelengths according to the wavelength. The plurality of optical signals with different wavelengths are transmitted into the first cavity body 520 through the first fiber optic adapter 510. The optical components in the first cavity body 520 split the optical signals according to the wavelength and transmit the optical signals after being split to a photosensitive surface of a corresponding light receiving chip. The light receiving chip receives a corresponding optical signal through the photosensitive surface. Since a light receiving chip usually receives an optical signal of one wavelength, the light receiving component 505 includes a plurality of light receiving chips, so as to receive the plurality of optical signals with different wavelengths.

For example, in a case where the light receiving assembly 500 is configured to receive optical signals of four different wavelengths, the light receiving component 505 includes four light receiving chips, so as to receive the optical signals of four wavelengths. Alternatively, as shown in FIG. 8, in a case where the light receiving assembly 500 is configured to receive optical signals of eight different wavelengths, the light receiving component 505 includes eight light receiving chips (583 and 593), so as to receive the optical signals of eight wavelengths.

In some embodiments, as shown in FIG. 7, the light receiving assembly 500 further includes a first lens group 530 and a plurality of wavelength division demultiplexers (DeMUXs) 506. The first lens group 530 includes a plurality of lenses, so as to split the optical signals transmitted from the first fiber optic adapter 510 to the first cavity body 520 for a first time according to a wavelength through mutual cooperation of the plurality of lenses. The plurality of optical signals split by the first lens group 530 each are incident on the corresponding wavelength division demultiplexer 506.

For example, the first lens group 530 splits the optical signals transmitted from the first fiber optic adapter 510 to the first cavity body 520 into two optical signals according to the wavelength. As shown in FIG. 7, the plurality of wavelength division demultiplexers 506 include a first wavelength division demultiplexer 540 and a second wavelength division demultiplexer 550. The two optical signals split by the first lens group 530 are incident on the first wavelength division demultiplexer 540 and the second wavelength division demultiplexer 550 respectively.

A wave band usually includes multiple wavelengths. For example, the light receiving assembly 500 is used to receive optical signals of eight different wavelengths (e.g., optical signals of wavelengths $\lambda 1$, $\lambda 2$, $\lambda 3$, $\lambda 4$, $\lambda 5$, $\lambda 6$, $\lambda 7$ and $\lambda 8$). Here, the wavelengths $\lambda 1$, $\lambda 2$, $\lambda 3$, and $\lambda 4$ are close to each other, and the wavelengths $\lambda 1$, $\lambda 2$, $\lambda 3$, and $\lambda 4$ are within a first wave band. The wavelengths $\lambda 5$, $\lambda 6$, $\lambda 7$ and $\lambda 8$ are close to each other, and the wavelengths $\lambda 5$, $\lambda 6$, $\lambda 7$ and $\lambda 8$ are within a second wave band. The first lens group 530 splits the optical signals transmitted by the first fiber optic adapter 510 into a first optical signal beam and a second optical signal beam. The optical signals within the first wave band constitute the first optical signal beam, and the optical signals within the second wave band constitute the second optical signal beam. Of course, in some embodiments, the first lens group 530 may also split the optical signals into three, four or more optical signals according to the wavelength.

The two optical signals split by the first lens group 530 each are incident on the corresponding wavelength division demultiplexer 506. The wavelength division demultiplexer 506 splits the optical signals incident on the wavelength division demultiplexer 506 for a second time according to the wavelength and transmits the optical signals after being split for the second time to the corresponding light receiving chip.

Figure 9:
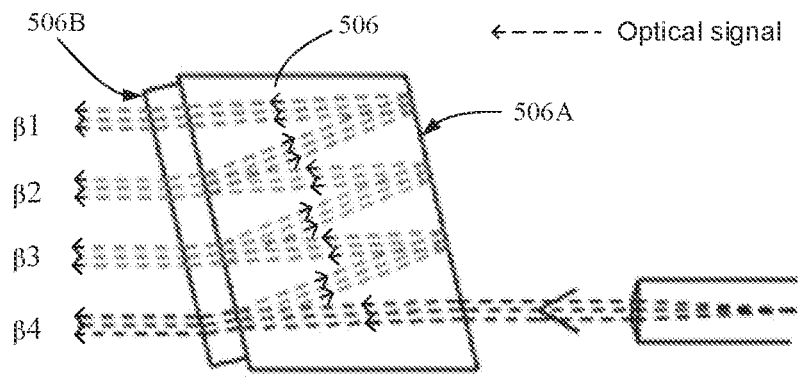
FIG. 9 is a diagram showing an optical path of a wavelength division demultiplexer, in accordance with some embodiments.

FIG. 9 is a diagram showing an optical path of a wavelength division demultiplexer, in accordance with some embodiments. As shown in FIG. 9, the wavelength division demultiplexer 506 has a light input end 506A and a light output end 506B. The light output end 506B of the wavelength division demultiplexer 506 is proximate to the light receiving component 505, and the light input end 506A of the wavelength division demultiplexer 506 is opposite to the light output end 506B. The wavelength division demultiplexer 506 includes a light inlet for receiving optical signals of multiple wavelengths, and the light inlet is located at the light input end 506A of the wavelength division demultiplexer 506. The wavelength division demultiplexer 506 further includes a plurality of light outlets for exit of the optical signals, each of the plurality of light outlets is used for exit of an optical signal of one wavelength. The plurality of light outlets are located at the light output end 506B of the wavelength division demultiplexer 506. The number of the light outlets is equal to the number of the plurality of optical signals with different wavelengths.

The beam splitting process of the wavelength division demultiplexer 506 is described below by considering an example in which optical signals of four different wavelengths (e.g., β1, β2, β3, and β4) exit from the wavelength division demultiplexer 506, and the wavelength division demultiplexer 506 includes four light outlets. It will be noted that the four light outlets are a first light outlet, a second light outlet, a third light outlet, and a fourth light outlet.

A beam of optical signals with four different wavelengths (e.g., β1, β2, β3, and β4) enters into the wavelength division demultiplexer 506 through the light inlet of the wavelength division demultiplexer 506. An optical signal of the wavelength β1 is reflected multiple times (e.g., six times) at a plurality of (e.g., six) different positions in the wavelength division demultiplexer 506 to reach the first light outlet; an optical signal of the wavelength β2 is reflected multiple times (e.g., four times) at a plurality of (e.g., four) different positions in the wavelength division demultiplexer 506 to reach the second light outlet; an optical signal of the wavelength β3 is reflected multiple times (e.g., twice) at a plurality of (e.g., two) different positions in the wavelength division demultiplexer 506 to reach the third light outlet; and an optical signal of the wavelength β4 is incident on the wavelength division demultiplexer 506 and reaches the fourth light outlet directly without being reflected. In this way, by providing the wavelength division demultiplexer 506, optical signals of different wavelengths are input through a same light inlet and are output through different light outlets, so that the wavelength division demultiplexer 506 can split optical signals of different wavelengths.

It can be understood that, the wavelength division demultiplexer 506 transmits and reflects optical signals of different wavelengths by different film layers disposed at different positions on two sides of the wavelength division demultiplexer 506, so as to split a beam of optical signals with different wavelengths into a plurality of optical signals with different wavelengths.

Of course, in some embodiments, the wavelength division demultiplexer 506 may also be used for splitting optical signals of two, three, five, or more wavelengths, and the present disclosure is not limited thereto.

The light receiving assembly 500 in some embodiments of the present disclosure will mainly be described below by considering an example in which the light receiving assembly 500 is configured to receive optical signals of eight different wavelengths, the optical signals with eight different wavelengths are within two wave bands (e.g., the first wave band and the second wave band), respectively, each of the two wave bands includes optical signals with four different wavelengths, and the light receiving assembly 500 includes two wavelength division demultiplexers 506.

In some embodiments, the light receiving assembly 500 may include one or more light receiving components 505. For example, as shown in FIG. 7, the plurality of light receiving components 505 include a first light receiving component 580 and a second light receiving component 590. The first lens group 530 splits the optical signals transmitted by the first fiber optic adapter 510 for the first time according to the wavelength, so as to obtain the first optical signal beam and the second optical signal beam.

The first optical signal beam is incident on the first wavelength division demultiplexer 540. The first wavelength division demultiplexer 540 splits the first optical signal beam into a first group of optical signals with four channels and transmits the first group of optical signals with four channels to the first light receiving component 580.

The second optical signal beam is incident on the second wavelength division demultiplexer 550. The second wavelength division demultiplexer 550 splits the second optical signal beam into a second group of optical signals with four channels and transmits the second group of optical signals with four channels to the second light receiving component 590.

In some embodiments, as shown in FIG. 8, the first light receiving component 580 includes a first light receiving chip 583, and the second light receiving component 590 includes a second light receiving chip 593. For example, the first light receiving component 580 includes a plurality of first light receiving chips 583, so as to correspond to the optical signals with the plurality of channels after being split by the first wavelength division demultiplexer 540; and the second light receiving component 590 includes a plurality of second light receiving chips 593, so as to correspond to the optical signals with the plurality of channels after being split by the second wavelength division demultiplexer 550. The light receiving chip (e.g., the first light receiving chip 583 and the second light receiving chip 593) may be a photoelectric detector (PD), so as to convert the received optical signal into the electrical signal (e.g., a current signal). For example, the photoelectric detector includes an avalanche photon diode (APD) and a PIN photo diode (PIN-PD).

In some embodiments, the first light receiving component 580 and the second light receiving component 590 each include a metallized ceramic. The plurality of light receiving chips of the first light receiving component 580 and the second light receiving component 590 each are disposed on a surface of the corresponding metallized ceramic. The metallized ceramic has a circuit pattern on a surface thereof, so as to power the light receiving chips. The metallized ceramic may be mounted on the flexible circuit board 310. Of course, in some embodiments, the light receiving component may not be provided with the metallized ceramic, in this case, the light receiving chips are directly mounted on the flexible circuit board 310. The metallized ceramic refers to a ceramic with a metal layer deposited on a surface thereof, and the metal layer is provided with a circuit pattern.

In addition, as shown in FIG. 8, the light receiving component 505 further includes a transimpedance amplifier 507. The transimpedance amplifier 507 is connected with the corresponding light receiving chip, so as to receive a current signal generated by the light receiving chip and convert the received current signal into a voltage signal. The transimpedance amplifier 507 is connected with the corresponding light receiving chip through a wire bonding process. For example, the transimpedance amplifier 507 is connected to the light receiving chip through a gold bonding wire. The transimpedance amplifier 507 may be mounted on the flexible circuit board 310, or the transimpedance amplifier 507 may be disposed on the electrical connecting member.

For example, as shown in FIG. 8, the first light receiving component 580 includes a first substrate 581 and a first transimpedance amplifier 582, and the first transimpedance amplifier 582 is disposed on a side of the first substrate 581 proximate to the circuit board 300. The first substrate 581 is made of the metallized ceramic, and the first substrate 581 is provided with a plurality (e.g., four) of first light receiving chips 583. The first substrate 581 facilitates the installation of the first light receiving chips 583. The first light receiving chips 583 are connected to the first transimpedance amplifier 582 through the wiring bonding process.

However, the longer lengths of connecting lines (e.g., the gold bonding wires) between the first light receiving chips 583 and the first transimpedance amplifier 582, the greater the inductance of the connecting lines and the worse the matching of the signals. An amplitude of the signal (e.g., small signal) output by the first light receiving chip 583 is small, and the signal is easy to be interfered, resulting in low signal quality. Therefore, it is required that the first light receiving chips 583 are provided proximate to the first transimpedance amplifier 582, so as to reduce the lengths of the connecting lines and improve the transmission quality of the signals. For example, the first transimpedance amplifier 582 is disposed on a side of the first substrate 581 and is proximate to the first substrate 581. Moreover, the first substrate 581 may also raise a height of each first light receiving chip 583, so as to make electrodes of the first light receiving chips 583 and pins of the first transimpedance amplifier 582 at a same height, thereby shortening the lengths of the connecting lines between the first light receiving chips 583 and the first transimpedance amplifier 582.

As shown in FIG. 8, the second light receiving component 590 includes a second substrate 591 and a second transimpedance amplifier 592, and the second transimpedance amplifier 592 is disposed on a side of the second substrate 591 proximate to the circuit board 300. The second substrate 591 is made of the metallized ceramic, and the second substrate 591 is provided with a plurality (e.g., four) of second light receiving chips 593. The second substrate 591 may facilitate the installation of the second light receiving chips 593. The second light receiving chips 593 are connected to the second transimpedance amplifier 592 through the wiring bonding process. Similar to the first substrate 581, the second substrate 591 is proximate to the second transimpedance amplifier 592, so as to reduce lengths of connecting lines between the second light receiving chips 593 and the second transimpedance amplifier 592. Moreover, the second substrate 591 may also raise a height of each second light receiving chip 593, so as to make electrodes of the second light receiving chips 593 and pins of the second transimpedance amplifier 592 at a same height, thereby shortening the lengths of the connecting lines between the second light receiving chips 593 and the second transimpedance amplifier 592.

It will be noted that, if the pins of a transimpedance amplifier 507 may correspond to the electrodes of the first light receiving chips 583 and the second light receiving chips 593, the light receiving assembly 500 may use one transimpedance amplifier 507. In this case, the first light receiving chips 583 and the second light receiving chips 593 may be disposed on a same metallized ceramic substrate.

In some embodiments, as shown in FIGS. 7 and 8, the light receiving assembly 500 further includes a second lens assembly 560 and a third lens assembly 570. The second lens assembly 560 and the third lens assembly 570 are disposed in the cavity 5203 of the first cavity body 520.

The second lens assembly 560 is located on an optical path between the first wavelength division demultiplexer 540 and the first light receiving component 580, and the second lens assembly 560 is configured to transmit the first group of optical signals with the plurality of channels (four channels) after being split by the first wavelength division demultiplexer 540 to the first light receiving component 580.

The third lens assembly 570 is located on an optical path between the second wavelength division demultiplexer 550 and the second light receiving component 590, and the third lens assembly 570 is configured to transmit the second group of optical signals with the plurality of channels (four channels) after being split by the second wavelength division demultiplexer 550 to the second light receiving component 590.

In the optical module 200 provided by some embodiments of the present disclosure, optical axes of the first group of optical signals with the plurality of channels and the second group of optical signals with the plurality of channels are parallel to a bottom surface of the first cavity body 520, and the photosensitive surfaces of the first light receiving chips 583 and the second light receiving chips 593 each are also parallel to the bottom surface of the first cavity body 520. It will be noted that, the bottom surface of the first cavity body 520 may refer to a bottom surface of the cavity 5203. For example, the bottom surface of the cavity 5203 may be parallel to the horizontal plane. In order to make the first light receiving chips 583 and the second light receiving chips 593 receive the corresponding optical signal (e.g., the first group of optical signals with the plurality of channels or the second group of optical signals with the plurality of channels), as shown in FIG. 8, the second lens assembly 560 includes a first reflecting prism 561, and the third lens assembly 570 includes a second reflecting prism 571.

The first reflecting prism 561 is disposed on a side (e.g., the upper side) of the first substrate 581 away from the base 5201, and a projection of the first reflecting prism 561 on the first substrate 581 covers the plurality of first light receiving chips 583 disposed on the first substrate 581. The first reflecting prism 561 is configured to reflect the first group of optical signals with the plurality of channels after being split by the first wavelength division demultiplexer 540 to the corresponding first light receiving chip 583. In this way, it is possible to change a direction of the optical axis of the first group of optical signals with the plurality of channels through the reflection of the first reflecting prism 561, so that the optical axis of the first group of optical signals with the plurality of channels is changed from a direction parallel to the bottom surface of the first cavity body 520 to a direction perpendicular to the bottom surface the first cavity body 520. As a result, the first group of optical signals with the plurality of channels are vertically incident on the photosensitive surface of the corresponding first light receiving chip 583.

Similarly, the second reflecting prism 571 is disposed on a side (e.g., the upper side) of the second substrate 591 away from the base 5201, and a projection of the second reflecting prism 571 on the second substrate 591 covers the plurality of second light receiving chips 593 disposed on the second substrate 591. The second reflecting prism 571 is configured to reflect the second group of optical signals with the plurality of channels after being split by the second wavelength division demultiplexer 550 to the corresponding second light receiving chip 593. In this way, it is possible to change a direction of the optical axis of the second group of optical signals with the plurality of channels through the reflection of the second reflecting prism 571, so that the optical axis of the second group of optical signals with the plurality of channels is changed from the direction parallel to the bottom surface of the first cavity body 520 to the direction perpendicular to the bottom surface the first cavity body 520. As a result, the second group of optical signals with the plurality of channels are vertically incident on the photosensitive surface of the corresponding second light receiving chip 593.

In some embodiments, referring to FIG. 8, the first reflecting prism 561 has a first reflecting surface 5610, and the second reflecting prism 571 has a second reflecting surface 5710. An included angle between the first reflecting surface 5610 and an exiting direction of the first group of optical signals with the plurality of channels after being split by the first wavelength division demultiplexer 540 is 45°, and a projection of the first reflecting surface 5610 on the first substrate 581 covers the plurality of first light receiving chips 583 disposed on the first substrate 581. An included angle between the second reflecting surface 5710 and an exiting direction of the second group of optical signals with the plurality of channels after being split by the second wavelength division demultiplexer 550 is 45°, and a projection of the second reflecting surface 5710 on the second substrate 591 covers the plurality of second light receiving chips 593 disposed on the second substrate 591.

Figure 10:
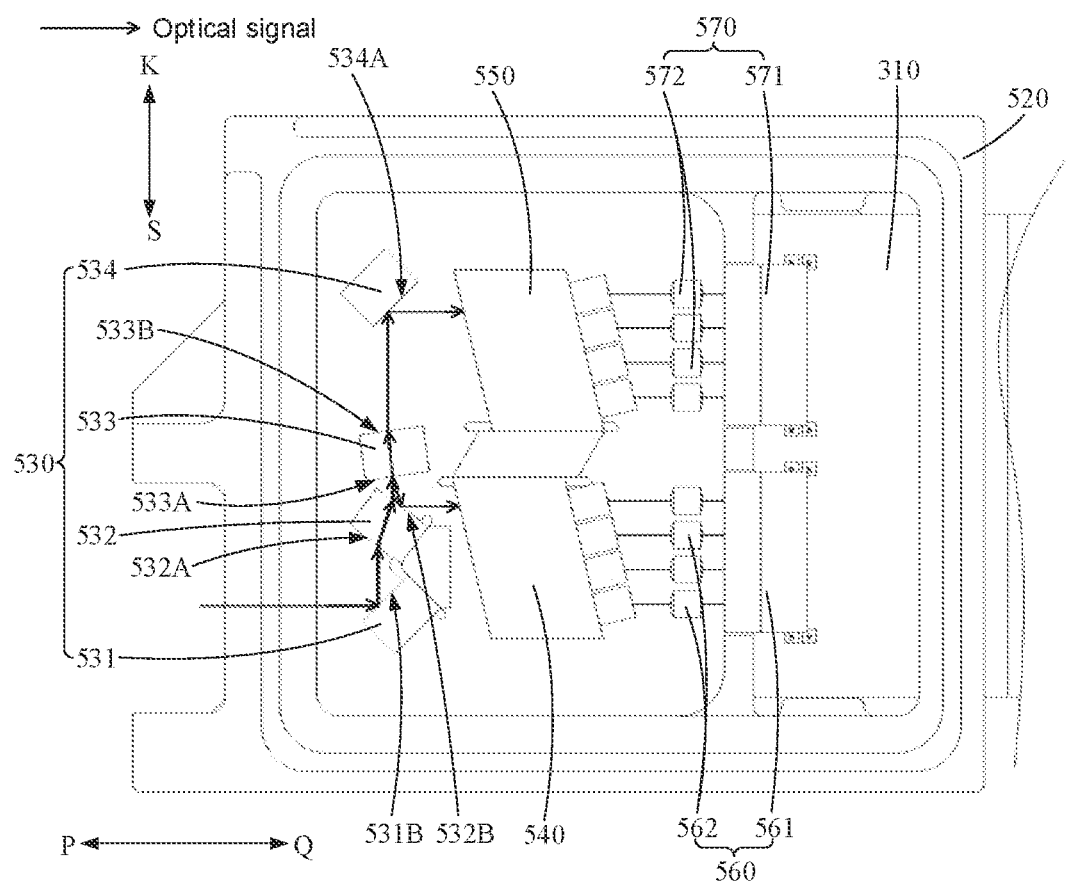
FIG. 10 is a top view of a light receiving assembly without a first cover plate, in accordance with some embodiments.

FIG. 10 is a top view of a light receiving assembly without a first cover plate, in accordance with some embodiments.

In some embodiments, as shown in FIG. 10, the second lens assembly 560 further includes a plurality of first converging lenses 562, and the third lens assembly 570 further includes a plurality of second converging lenses 572.

The plurality of first converging lenses 562 each are disposed on a light-exit side of the first wavelength division demultiplexer 540, and the plurality of first converging lenses 562 correspond to a plurality of light outlets of the first wavelength division demultiplexer 540 respectively. Each first converging lens 562 is configured to converge the corresponding optical signal exiting from the first wavelength division demultiplexer 540 to the first reflecting prism 561.

The plurality of second converging lenses 572 each are disposed on a light-exit side of the second wavelength division demultiplexer 550, and the plurality of second converging lenses 572 correspond to a plurality of light outlets of the second wavelength division demultiplexer 550 respectively. Each second converging lens 572 is configured to converge the corresponding optical signal exiting from the second wavelength division demultiplexer 550 to the second reflecting prism 571.

For example, the second lens assembly 560 includes four first converging lenses 562, and the third lens assembly 570 includes four second converging lenses 572.

Figure 11:
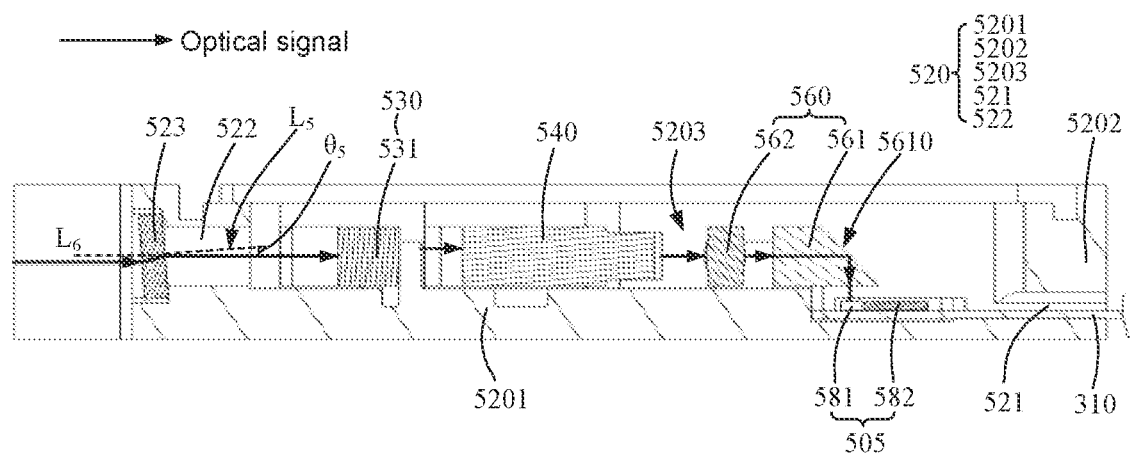
FIG. 11 is a sectional view showing a portion of a light receiving assembly, in accordance with some embodiments.

FIG. 11 is a sectional view showing a portion of a light receiving assembly, in accordance with some embodiments.

As shown in FIGS. 8 and 11, the first wavelength division demultiplexer 540 splits the first optical signal beam incident thereon into the first group of optical signals with the plurality of channels according to the wavelength. The first group of optical signals with the plurality of channels each are incident on the corresponding first converging lens 562 and then are incident on the first reflecting prism 561 after being converged by the corresponding first converging lens 562. After an optical signal incident on the first reflecting prism 561 is reflected by the first reflecting surface 5610, a transmission direction of the optical signal is changed from the direction parallel to the bottom surface of the first cavity body 520 to the direction perpendicular to the bottom surface of the first cavity body 520, and is incident on the corresponding first light receiving chip 583 located on a side (e.g., the lower side) of the first reflecting prism 561 proximate to the base 5201.

In some embodiments, the first lens group 530 includes a plurality of lenses. The plurality of lenses may split the optical signals transmitted by the first fiber optic adapter 510 into the first optical signal beam and the second optical signal beam according to the wavelength. For example, the first lens group 530 includes four lenses arranged in sequence. In this way, by applying a film on a surface of the corresponding lens, it is possible to reflect or refract the optical signals within different wave bands, so as to split the optical signals according to the wavelength.

Figure 12:
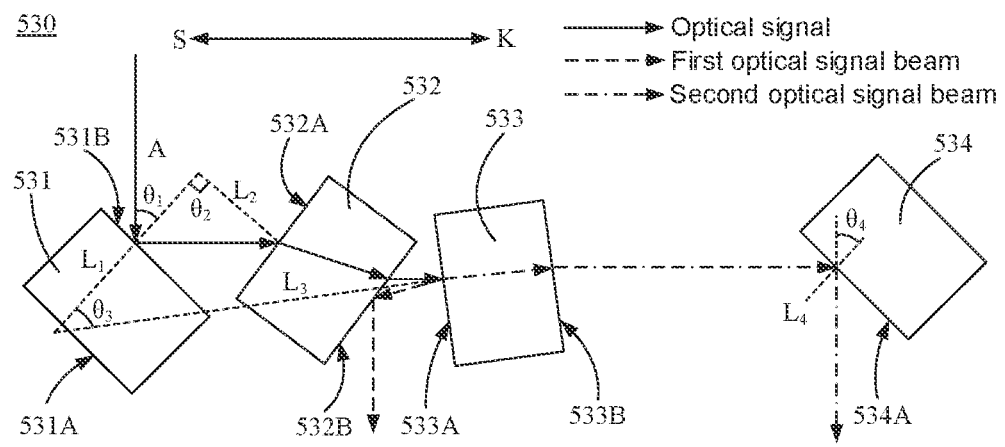
FIG. 12 is a diagram showing an optical path of a first lens group, in accordance with some embodiments.

FIG. 12 is a diagram showing an optical path of a first lens group, in accordance with some embodiments.

For example, as shown in FIGS. 10 and 12, the first lens group 530 includes a first lens 531, a second lens 532, a third lens 533, and a fourth lens 534. The first lens 531, the second lens 532, the third lens 533, and the fourth lens 534 are arranged in sequence in a width direction (e.g., the SK direction) of the first cavity body 520. The optical signals, transmitted by the first fiber optic adapter 510 to the first cavity body 520 include optical signals of wavelengths $\lambda 1$, $\lambda 2$, $\lambda 3$, $\lambda 4$, $\lambda 5$, $\lambda 6$, $\lambda 7$, and $\lambda 8$.

As shown in FIGS. 10 and 12, a beam of optical signals including eight wavelengths is incident on a second surface 531B of the first lens 531. The second surface 531B of the first lens 531 reflects the beam of optical signals, so as to change a transmission direction of the beam of optical signal.

The beam of optical signals reflected by the first lens 531 is incident on a first surface 532A of the second lens 532, and the first surface 532A of the second lens 532 refracts the beam of optical signals. The beam of optical signals after being refracted is incident into the second lens 532 and is incident on a second surface 532B of the second lens 532 after passing through the second lens 532. The second surface 532B of the second lens 532 is coated with an angle selection film. The beam of optical signals incident on the second surface 532B of the second lens 532 exits from the second lens 532 after being refracted by the second surface 532B of the second lens 532.

The beam of optical signals exiting from the second lens 532 is incident on a first surface 533A of the third lens 533. The first surface 533A of the third lens 533 is coated with an angle selection film. In this way, after the second lens 532 adjusts an incident angle of the beam of optical signals, optical signals within the first wave band incident on the first surface 533A of the third lens 533 may be reflected, and optical signals within the second wave band incident on the first surface 533A of the third lens 533 may be refracted. The optical signals within the first wave band in the beam of optical signals are reflected by the first surface 533A of the third lens 533, so as to form the first optical signal beam. The optical signals within the second wave band in the beam of optical signals are refracted by the first surface 533A of the third lens 533, so as to form the second optical signal beam.

The first optical signal beam reflected by the first surface 533A of the third lens 533 is incident on the second surface 532B of the second lens 532. Since an incident angle of the first optical signal beam again incident on the second surface 532B of the second lens 532 has changed, the first optical signal beam may be reflected to a light input end of the first wavelength division demultiplexer 540 by the second surface 532B of the second lens 532.

The second optical signal beam refracted by the first surface 533A of the third lens 533 is incident into the third lens 533 and is incident on a second surface 533B of the third lens 533 after passing through the third lens 533. The second optical signal beam incident on the second surface 533B of the third lens 533 exits from the third lens 533 after being refracted by the second surface 533B of the third lens 533.

The second optical signal beam exiting from the third lens 533 is incident on a first surface 534A of the fourth lens 534 and is reflected to a light input end of the second wavelength division demultiplexer 550 by the first surface 534A of the fourth lens 534.

It will be noted that the first surface and the second surface of the above lenses are only used to distinguish working surfaces on two sides of the corresponding lens. In FIG. 10, a surface of each lens proximate to the lower side is the first surface, and a surface opposite the first surface and proximate to the upper side is the second surface. For the up and down direction here, reference may be made to the KS direction in FIG. 10.

As shown in FIG. 10, the optical signals transmitted by the first fiber optic adapter 510 are incident into the first cavity body 520 in a length direction (e.g., the PQ direction) of the first cavity body 520. Therefore, in order to reduce a length of the first cavity body 520, a size of the space, occupied by the optical components to achieve splitting the optical signals for the first time, needs to be reduced in the length direction of the first cavity body 520.

In this case, the first lens 531 is configured to change a transmission direction of the optical signals incident into the first cavity body 520, so as to convert the transmission direction of the optical signals from the length direction of the first cavity body 520 to the width direction of the first cavity body 520. The second lens 532 is configured to transmit the optical signals within the first and second wave bands exiting from the first lens 531 and reflect the optical signals within the first wave band reflected by the third lens 533. The third lens 533 is configured to reflect the optical signals within the first wave band and transmit the optical signals within the second wave band. The fourth lens 534 is configured to reflect the optical signals within the second wave band.

In this way, by providing the first lens 531, the second lens 532, the third lens 533, and the fourth lens 534, the beam of optical signals including different wavelengths may be split for the first time according to the wavelength, and the two beams of optical signals after being split may be transmitted to the corresponding wavelength division demultiplexer 506 along the length direction of the first cavity body 520.

In some embodiments, as shown in FIG. 12, an included angle $\theta_1$ between a normal line $L_1$ of the second surface 531B of the first lens 531 and a transmission direction (e.g., the first direction A) of the optical signals transmitted by the first fiber optic adapter 510 to the first cavity body 520 is 45°. An included angle $\theta_2$ between the normal line $L_1$ of the second surface 531B of the first lens 531 and a normal line $L_2$ of the first surface 532A of the second lens 532 is 90°. That is to say, an included angle between the normal line $L_2$ of the first surface 532A of the second lens 532 and the first direction A is 135°. An included angle $\theta_3$ between the normal line $L_1$ of the second surface 531B of the first lens 531 and a normal line $L_3$ of the first surface 533A of the third lens 533 is 37°. That is to say, an included angle between the normal line $L_3$ of the first surface 533A of the third lens 533 and the first direction A is 82° (e.g., a sum of the included angle $\theta_1$ and the included angle $\theta_3$). An included angle between the normal line $L_1$ of the second surface 531B of the first lens 531 and a normal line $L_4$ of the first surface 534A of the fourth lens 534 is 180°. That is to say, the second surface 531B of the first lens 531 is parallel to the first surface 534A of the fourth lens 534, and an included angle $\theta_4$ between the normal line $L_4$ of the first surface 534A of the fourth lens 534 and the first direction A is 45°. Moreover, by applying a film on the second surface 532B of the second lens 532 and applying a film on the first surface 533A of the third lens 533, it is possible to split the optical signals within the first wave band and the optical signals within the second wave band from the beam of optical signals.

Figure 13:
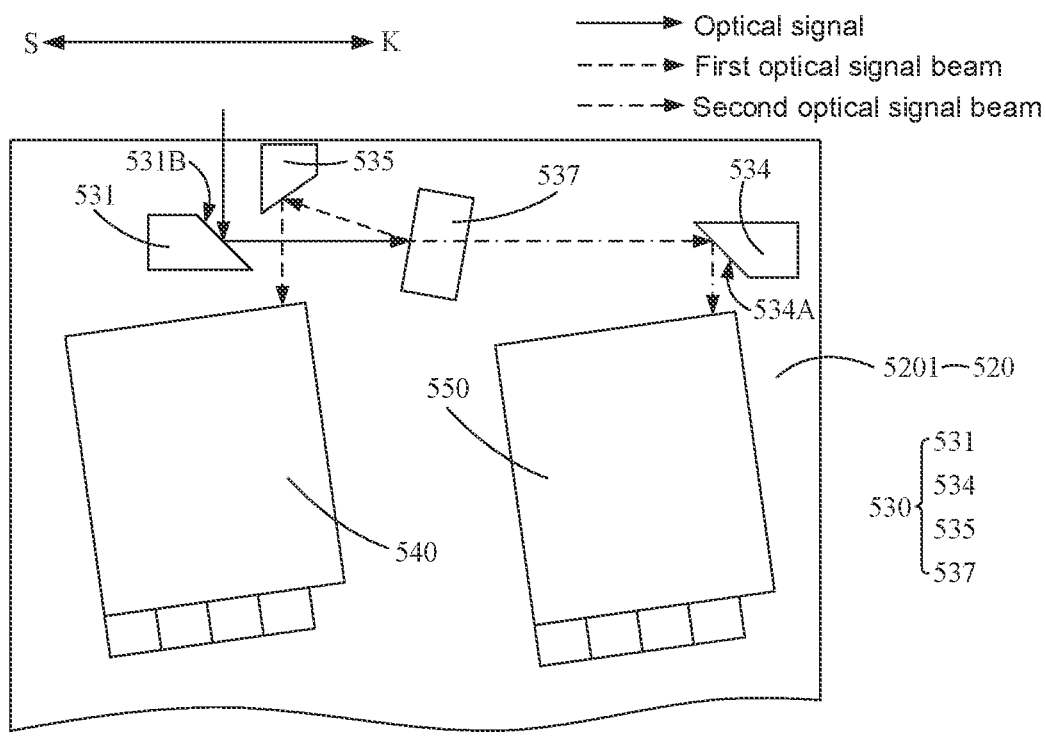
FIG. 13 is a diagram showing an optical path of another first lens group, in accordance with some embodiments.

FIG. 13 is a diagram showing an optical path of another first lens group, in accordance with some embodiments.

Of course, the first lens group 530 is not limited to the combination of the above multiple lenses. In some embodiments, as shown in FIG. 13, the first lens group 530 includes a first lens 531, an optical filter 537, a fourth lens 534, and a fifth lens 535. The first lens 531, the fifth lens 535, the optical filter 537, and the fourth lens 534 are arranged in the width direction of the first cavity body 520.

The first lens 531 is configured to reflect the optical signals transmitted by the first fiber optic adapter 510 to the first cavity body 520, so as to change a propagation direction of the optical signals. The optical filter 537 is configured to receive the optical signals reflected by the first lens 531, reflect the first optical signal beam in the optical signals, and transmit the second optical signal beam in the optical signals. The fifth lens 535 is configured to reflect the first optical signal beam to the first wavelength division demultiplexer 540. The fourth lens 534 is configured to reflect the second optical signal beam to the second wavelength division demultiplexer 550.

A beam of optical signals including eight wavelengths is incident on a second surface 531B of the first lens 531. The second surface 531B of the first lens 531 reflects the beam of optical signals, so as to change a transmission direction of the beam of optical signals.

The beam of optical signals reflected by the first lens 531 is incident on the optical filter 537. A portion (e.g., the first optical signal beam) of the beam of optical signals incident on the optical filter 537 is reflected by the optical filter 537, and another portion (e.g., the second optical signal beam) of the beam of optical signals incident on the optical filter 537 is transmitted through the optical filter 537.

The first optical signal beam reflected by the optical filter 537 is incident on the fifth lens 535. The fifth lens 535 reflects the first optical signal beam to the light input end of the first wavelength division demultiplexer 540.

The second optical signal beam transmitted through the optical filter 537 is incident on a first surface 534A of the fourth lens 534. The first surface 534A of the fourth lens 534 reflects the second optical signal beam to the light input end of the second wavelength division demultiplexer 550.

In this way, by providing the first lens 531, the optical filter 537, the fourth lens 534 and the fifth lens 535, the beam of optical signals including different wavelengths may be split for the first time according to the wavelength, and the two beams of optical signals after being split may be transmitted to the corresponding wavelength division demultiplexer 506 along the length direction of the first cavity body 520.

Of course, in some embodiments, the first lens group 530 may also include other numbers of lenses. For example, the first lens group 530 may include three lenses. Two of the three lenses are the first lens 531 and the fourth lens 534 in FIG. 10. The other of the three lenses is a sixth lens, and the sixth lens is disposed between the first lens 531 and the fourth lens 534. A first surface of the sixth lens is configured to reflect the optical signals within the first wave band and transmit the optical signals within the second wave band, and a second surface of the sixth lens is configured to transmit the optical signals within the second wave band. In this way, the beam of optical signals may also be split by the first lens 531, the sixth lens, and the fourth lens 534 according to the wavelength.

In some embodiments, as shown in FIGS. 7 and 11, the light receiving assembly 500 further includes a flat lens 523. The flat lens 523 is disposed in the first via hole 522 and is disposed obliquely with respect to the transmission direction of the optical signals transmitted by the first fiber optic adapter 510. The optical signals transmitted by the first fiber optic adapter 510 to the first via hole 522 are incident on the second surface 531B of the first lens 531 after passing through the flat lens 523.

When the optical signals are incident on the second surface 531B of the first lens 531, a part of the optical signals may be transmitted through the second surface 531B of the first lens 531 and be incident on a first surface 531A of the first lens 531, and then be incident into the first via hole 522 again after being reflected by the first surface 531A of the first lens 531 and refracted by the second surface 531B of the first lens 531 in turn. The flat lens 523 disposed obliquely may prevent the optical signals incident into the first via hole 522 again from affecting the optical signals transmitted by the first fiber optic adapter 510 to the first via hole 522.

Moreover, in order to avoid excessive displacement of the optical signals passing through the flat lens 523, it is necessary to arrange an oblique angle of the flat lens 523 reasonably. In some embodiments, an included angle 85 between an optical axis (referring to the dashed line $L_5$ in FIG. 11) of the flat lens 523 and a central axis (referring to the dashed line $L_6$ in FIG. 11) of the first via hole 522 satisfies a preset threshold. The preset threshold is any value within a range of 4° to 6° inclusive. For example, the preset threshold is 4°, 5°, or 6°. In this way, it may not only prevent the optical signals reflected by the first lens 531 and incident into the first via hole 522 again from affecting the transmission of the optical signals, but also prevent the optical signals transmitted by the first fiber optic adapter 510 to the first via hole 522 from shifting too much after passing through the flat lens 523. In addition, the flat lens 523 may also close the first via hole 522, so as to facilitate the sealing of the first cavity body 520.

In the optical module 200 provided by some embodiments of the present disclosure, the light receiving assembly 500 is connected to the external optical fiber through the first fiber optic adapter 510, and optical signals transmitted by the external optical fiber are transmitted into the first cavity body 520 through first fiber optic adapter 510. The first cavity body 520 receives the optical signals transmitted by the first fiber optic adapter 510 and splits the optical signals for the first time according to the wavelength and the optical signals for the second time according to the wavelength through the first lens group 530 and the plurality of wavelength division demultiplexers 506 in turn. The optical signals after being split twice are transmitted to the light receiving component 505 and converted into electrical signals (e.g., current signals or voltage signals) by the light receiving component 505. Thus, the optical module 200 may receive the optical signals including multiple wavelengths transmitted by the external optical fiber and may simultaneously transmit optical signals of multiple wavelengths in a single optical fiber.

It is generally required that, the second fiber optic adapter 410 and the first fiber optic adapter 510 are located at a same height, while the light emitting assembly 400 and the light receiving assembly 500 in some embodiments of the present disclosure are stacked up and down. Therefore, it is necessary to adjust an optical path height of the optical signals transmitted by the first fiber optic adapter 510 or an optical path height of the optical signals output by the light emitting assembly 400 to the second fiber optic adapter 410.

In some embodiments, as shown in FIG. 7, the light receiving assembly 500 further includes a displacement component 524. An end of the displacement component 524 is connected with the first fiber optic adapter 510, and the other end of the displacement component 524 is connected with the first cavity body 520. The displacement component 524 is configured to adjust the optical path height of the optical signals transmitted by the first fiber optic adapter 510 in the height direction of the optical module 200.

For example, in the height direction of the optical module 200, the optical path height of the optical signals transmitted by the first fiber optic adapter 510 is higher than an optical path height of the optical signals transmitted in the first cavity body 520. In this way, it is possible to reduce the optical path height of the optical signals transmitted by the first fiber optic adapter 510 through the displacement component 524, so that the optical signals may be transmitted from the first fiber optic adapter 510 with a relatively high position to the first cavity body 520 with a relatively low position.

Figure 14:
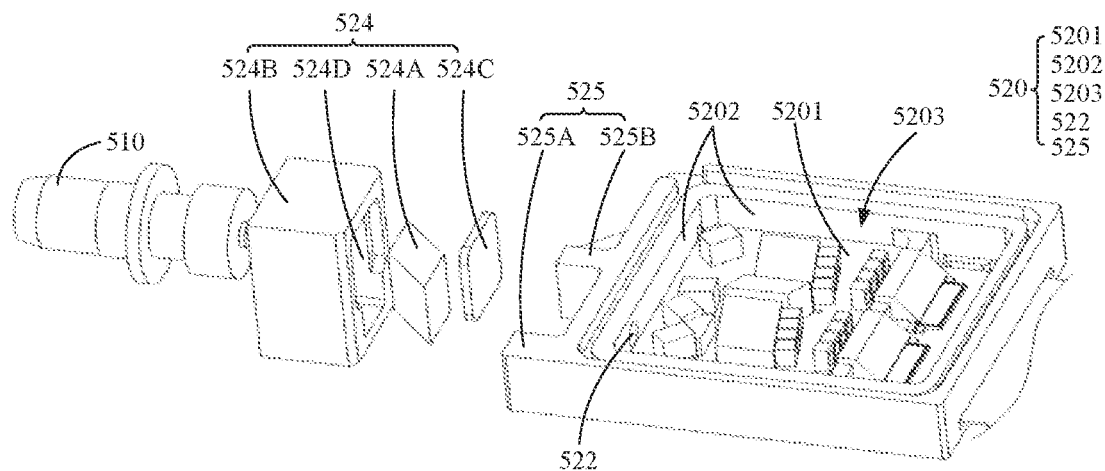
FIG. 14 is an exploded view showing a portion of a light receiving assembly, in accordance with some embodiments.
Figure 15:
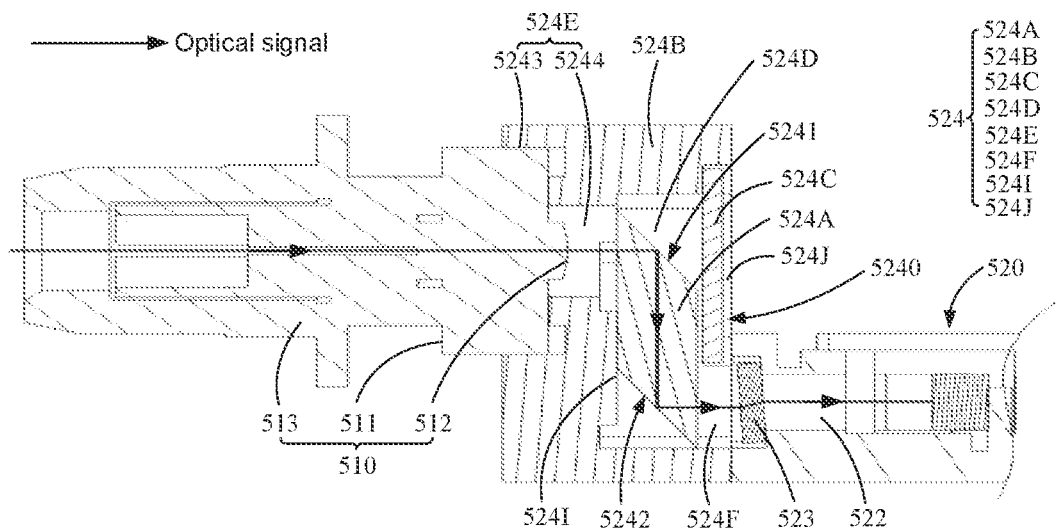
FIG. 15 is a sectional view of a first fiber optic adapter and a light receiving assembly, in accordance with some embodiments.

FIG. 14 is an exploded view showing a portion of a light receiving assembly, in accordance with some embodiments. FIG. 15 is a sectional view of a first fiber optic adapter and a light receiving assembly, in accordance with some embodiments.

In some embodiments, as shown in FIGS. 14 and 15, the displacement component 524 includes a displacement prism 524A, a prism cavity body 524B, and a second cover plate 524C.

The prism cavity body 524B includes a prism accommodating cavity 524D, and the displacement prism 524A is disposed in the prism accommodating cavity 524D. The displacement prism 524A is configured to adjust the optical path height of the optical signals transmitted by the first fiber optic adapter 510 in the height direction of the optical module 200. For example, the displacement prism 524A adjusts the optical signals transmitted at a height to another height through two or more reflections.

For example, as shown in FIG. 15, the displacement prism 524A includes a third reflecting surface 5241 and a fourth reflecting surface 5242. The third reflecting surface 5241 and the fourth reflecting surface 5242 are parallel to each other, and an included angle between each of the two reflecting surfaces and the optical axis of the optical signals transmitted by the first fiber optic adapter 510 is 45°. The optical signals are reflected twice through the two reflecting surfaces, so that the optical signals transmitted at a relatively high height are adjusted to be transmitted at a relatively low height.

The prism cavity body 524B is connected with the first fiber optic adapter 510 and the first cavity body 520. The first fiber optic adapter 510 communicates with the prism cavity body 524B through prism accommodating cavity 524D, and the prism accommodating cavity 524D communicates with the first via hole 522. A side of the prism cavity body 524B proximate to the first cavity body 520 is open, so as to form a second opening 5240. The second cover plate 524C is configured to close the second opening 5240. For example, the second cover plate 524C covers a side of the prism accommodating cavity 524D proximate to the first cavity body 520, so as to limit the displacement prism 524A inside the prism accommodating cavity 524D, and the second cover plate 524C may be fixedly connected with the prism cavity body 524B through glue. In this way, it is possible to improve an installation accuracy of the displacement prism 524A.

The second cover plate 524C closes a portion of the second opening 5240. An exposed portion of the second opening 5240 forms a second via hole 524F, and the second via hole 524F communicates with the first via hole 522.

In some embodiments, as shown in FIG. 15, the displacement component 524 further includes a support step 524I and a cover plate groove 524J. The support step 524I is disposed in the prism accommodating cavity 524D, so as to support and limit the displacement prism 524A. The cover plate groove 524J is disposed on a side of the prism accommodating cavity 524D proximate to the first cavity body 520, so as to fix the second cover plate 524C.

In some embodiments, as shown in FIG. 15, the displacement component 524 further includes a connecting hole 524E, and the connecting hole 524E is disposed on a side of the prism cavity body 524B proximate to the first fiber optic adapter 510, and the connecting hole 524E communicates with the prism accommodating cavity 524D. For example, the connecting hole 524E includes a counterbore 5243 and a connecting sub-hole 5244 communicated with each other, the counterbore 5243 is closer to the first fiber optic adapter 510 than the connecting sub-hole 5244, and the connecting sub-hole 5244 communicates with the prism accommodating cavity 524D.

In this case, the first fiber optic adapter 510 includes an adapter body 513 and a connector 511. The connector 511 is disposed at an end of the adapter body 513 proximate to the displacement component 524, and the connector 511 is matched with the connecting hole 524E. For example, the connector 511 is inserted into the counterbore 5243.

In addition, the first fiber optic adapter 510 further includes a collimating lens 512, and the collimating lens 512 is disposed on a side of the connector 511 proximate to the displacement component 524 and is located in the connecting sub-hole 5244. The collimating lens 512 is configured to collimate the optical signals transmitted by the first fiber optic adapter 510.

Figure 16:
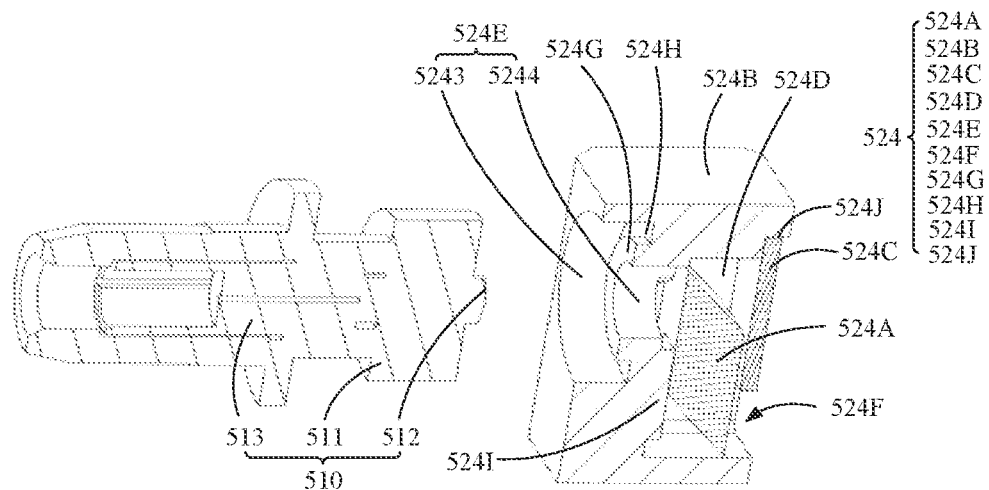
FIG. 16 is a sectional view of a first fiber optic adapter and a displacement component, in accordance with some embodiments.

FIG. 16 is a sectional view of a first fiber optic adapter and a displacement component, in accordance with some embodiments.

In some embodiments, as shown in FIG. 16, the displacement component 524 further includes a first connecting groove 524H and a first protrusion 524G. The first connecting groove 524H is disposed on a bottom wall of the counterbore 5243 and is proximate to an inner wall of the counterbore 5243. The first connecting groove 524H is recessed in a direction away from the first fiber optic adapter 510, so as to form the first protrusion 524G on the bottom wall of the counterbore 5243. The first protrusion 524G abuts against an end of the connector 511 proximate to the displacement component 524, so as to support the end of the connector 511.

In this way, by providing the first connecting groove 524H, it is convenient to process the first protrusion 524G. For example, the first connecting groove 524H is convenient for a tool retraction of a turning tool when the first protrusion 524G is processed through a turning process. Moreover, when the first fiber optic adapter 510 is connected with the prism cavity body 524B through glue dispensing, excess glue may also flow into the first connecting groove 524H, so as to avoid glue overflow affecting the collimating effect of the collimating lens 512.

It is assumed that a direction of the optical axis of the optical signals transmitted from the outside of the optical module 200 to the first fiber optic adapter 510 is parallel to the horizontal plane, and the optical signals are transmitted along a central axis of the first fiber optic adapter 510. A transmission path of the optical signals is shown in FIG. 15. As shown in FIG. 15, the optical signals whose optical axis is horizontal are incident on the collimating lens 512 of the first fiber optic adapter 510, and then are incident on the third reflecting surface 5241 of the displacement prism 524A after being collimated by the collimating lens 512. The optical signals incident on the third reflecting surface 5241 are reflected for a first time by the third reflecting surface 5241, and the optical axis of the optical signals is converted from a horizontal direction to a vertical direction. The optical signals whose optical axis is vertical are incident on the fourth reflecting surface 5242 of the displacement prism 524A and are reflected for a second time by the fourth reflecting surface 5242. The optical axis of the optical signals is converted from the vertical direction to the horizontal direction. The optical signals reflected by the fourth reflecting surface 5242 are transmitted through the flat lens 523 through the second via hole 524F and then are incident into the first cavity body 520 through the first via hole 522.

In some embodiments of the present disclosure, it is possible to adjust a height of the optical axis of the optical signals through the displacement prism 524A in a case where the direction of the optical axis of the optical signals is parallel to the horizontal plane, so that the light emitting assembly 400 and the light receiving assembly 500 are arranged in a stack.

In order to facilitate connection between the displacement component 524 and the first cavity body 520, in some embodiments, as shown in FIG. 14, the first cavity body 520 further includes a connecting portion 525. The connecting portion 525 is disposed on a side of the side wall 5202 (e.g., a side sub-wall 5202A in FIG. 7) proximate to the displacement component 524, and the connecting portion 525 is configured to be clamped with the displacement component 524.

For example, as shown in FIG. 14, the connecting portion 525 includes a first connecting plate 525A and a second connecting plate 525B. The first connecting plate 525A and the second connecting plate 525B are opposite to each other and are located on two sides of the displacement component 524 respectively. The first connecting plate 525A and the second connecting plate 525B are approximately perpendicular to the side sub-wall 5202A. Sides of the first connecting plate 525A and the second connecting plate 525B proximate to the displacement component 524 each are connected with an outer surface of the prism cavity body 524B, so as to make the prism cavity body 524B be clamped between the first connecting plate 525A and the second connecting plate 525B. Here, the first connecting plate 525A and the second connecting plate 525B may be two protrusions, and portions of the side wall 5202 protrudes outward to form the two protrusions, so that the first cavity body 520 is a one-piece member.

In some embodiments, the connecting portion 525 further includes a support structure, and the support structure may be disposed on a side of the first connecting plate 525A or the second connecting plate 525B, so as to increase a connecting area between the first connecting plate 525A and the side wall 5202 or the second connecting plate 525B and the side wall 5202, thereby improving the structural strength of the first connecting plate 525A or the second connecting plate 525B.

Figure 17:
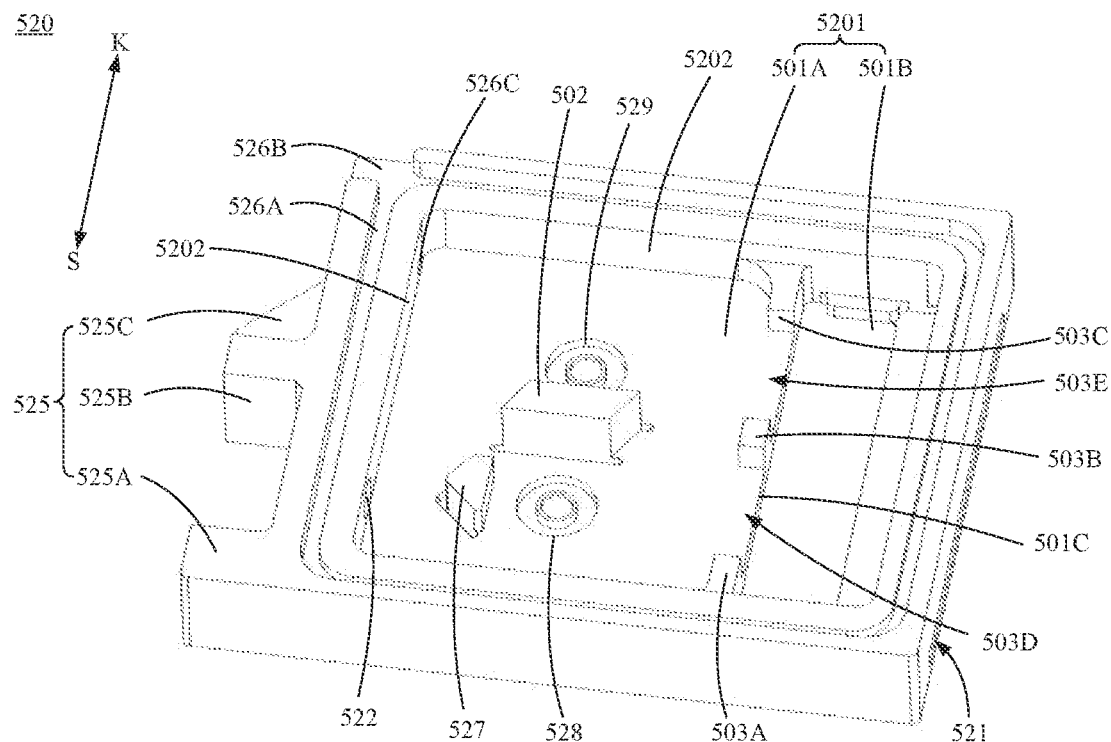
FIG. 17 is a diagram showing a structure of a first cavity body, in accordance with some embodiments.

FIG. 17 is a diagram showing a structure of a first cavity body, in accordance with some embodiments. For example, as shown in FIG. 17, the connecting portion 525 further includes a support structure 525C, and the support structure 525C is disposed on a side of the second connecting plate 525B away from the first connecting plate 525A. The support structure 525C is connected with the second connecting plate 525B and the side wall 5202, so as to increase the structural strength of the second connecting plate 525B, thereby improving the reliability of connection between the prism cavity body 524B and the first cavity body 520.

In some embodiments of the present disclosure, the displacement component 524 is provided between the first fiber optic adapter 510 and the first cavity body 520. The optical signals transmitted by the first fiber optic adapter 510 are incident into the first cavity body 520 through the displacement component 524. The displacement component 524 may adjust the optical path height of the optical signals transmitted by the first fiber optic adapter 510, so as to adjust the optical path height of the optical signals transmitted by the first fiber optic adapter 510 to the first cavity body 520. In this way, by adjusting the optical path height between the first fiber optic adapter 510 and the first cavity body 520, the light emitting assembly 400 and the light receiving assembly 500 may be stacked up and down in a case where the second fiber optic adapter 410 and the first fiber optic adapter 510 are located at a same height, so as to meet requirements of the light emitting assembly 400 and the light receiving assembly 500 for a large volume. Of course, in some embodiments, the displacement component 524 may also be disposed on the light emitting assembly 400, so as to adjust an optical path height between the light emitting assembly 400 and the second fiber optic adapter 410.

Figure 18:
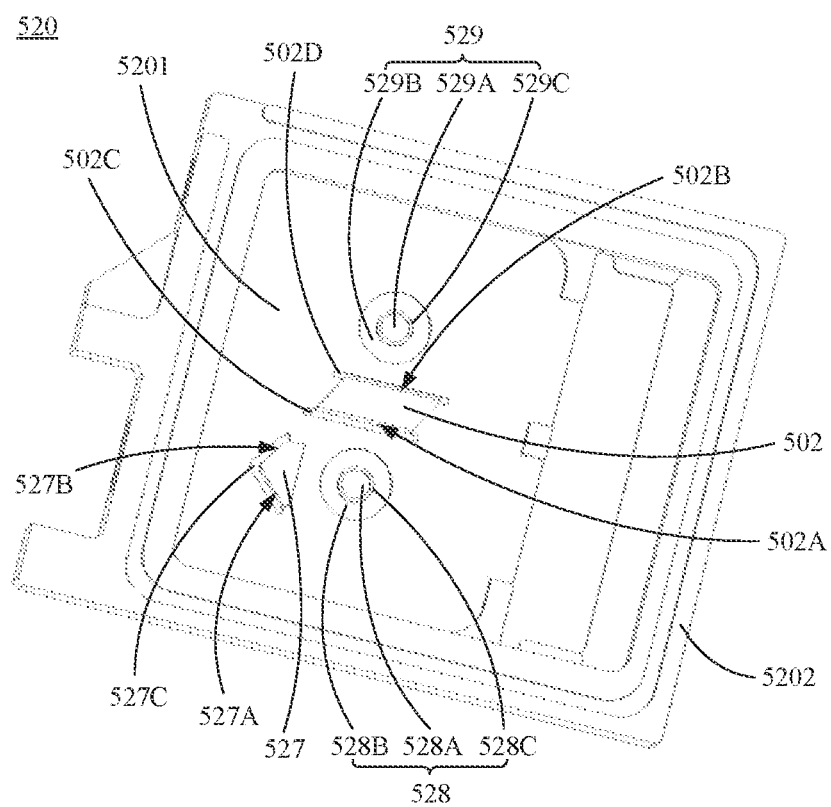
FIG. 18 is a diagram showing a structure of a first cavity body from another perspective, in accordance with some embodiments.

FIG. 18 is a diagram showing a structure of a first cavity body from another perspective, in accordance with some embodiments.

In some embodiments, as shown in FIGS. 17 and 18, the first cavity body 520 further includes a first mounting post 527. The first mounting post 527 is disposed on the base 5201, and the first mounting post 527 is in a shape of a right prism (e.g., a triangular prism).

The first mounting post 527 includes a first mounting surface 527A and a second mounting surface 527B, and there is a preset included angle between the first mounting surface 527A and the second mounting surface 527B, so as to match a relative mounting angle between the first lens 531 and the second lens 532. The first lens 531 is connected with (e.g., abuts against) the first mounting surface 527A, so as to limit and support the first lens 531 through the first mounting surface 527A. The second lens 532 is connected with (e.g., abuts against) the second mounting surface 527B, so as to limit and support the second lens 532 through the second mounting surface 527B.

In some embodiments of the present disclosure, by providing the first mounting post 527 including the first mounting surface 527A and the second mounting surface 527B, it is convenient to achieve the coupling of the first lens 531 and the second lens 532 in a passive manner, thereby improving the installation efficiency and accuracy of the first lens 531 and the second lens 532.

In some embodiments, the first cavity body 520 further includes a first groove 527C. The first groove 527C is disposed on the base 5201 and is recessed towards a bottom of the base 5201. The first groove 527C is disposed adjacent to the first mounting surface 527A and the second mounting surface 527B of the first mounting post 527, and a projection of the first groove 527C on the base 5201 is located outside a projection of the first mounting post 527 on the base 5201. In this way, it is convenient to process the first mounting surface 527A and the second mounting surface 527B by providing the first groove 527C.

For example, by providing the first groove 527C, it is convenient to achieve a tool retraction of a turning tool when the first mounting post 527 is processed through a turning process. Moreover, by providing the first groove 527C, it is possible to avoid an arc chamfer at the connecting position between the first mounting surface 527A and the base 5201, and an arc chamfer at the connecting position between the second mounting surface 527B and the base 5201, so that the first lens 531 and the second lens 532 may be closely contacted with the first mounting surface 527A and the second mounting surface 527B respectively, so as to improve the installation accuracy of the first lens 531 and the second lens 532. In addition, when the first lens 531 and the second lens 532 are connected with the base 5201 through glue dispensing, excess glue may flow into the first groove 527C, so as to prevent the glue from affecting the installation accuracy of the first lens 531 and the second lens 532.

In some embodiments, as shown in FIGS. 17 and 18, the first cavity body 520 further includes a second mounting post 502. The second mounting post 502 is disposed on the base 5201, and the second mounting post 502 is in a shape of a right prism (e.g., a quadrangular prism). The second mounting post 502 includes a third mounting surface 502A and a fourth mounting surface 502B disposed opposite to each other. The first wavelength division demultiplexer 540 is connected with (e.g., abuts against) the third mounting surface 502A, so as to limit and fix the first wavelength division demultiplexer 540 through the third mounting surface 502A. The second wavelength division demultiplexer 550 is connected with (e.g., abuts against) the fourth mounting surface 502B, so as to limit and fix the second wavelength division demultiplexer 550 through the fourth mounting surface 502B.

In some embodiments, the third mounting surface 502A is parallel to the fourth mounting surface 502B.

In some embodiments of the present disclosure, by providing the second mounting post 502 including the third mounting surface 502A and the fourth mounting surface 502B, it is convenient to achieve the coupling of the first wavelength division demultiplexer 540 and the second wavelength division demultiplexer 550 in a passive manner, so that it is convenient to improve the installation efficiency and accuracy of the first wavelength division demultiplexer 540 and the second wavelength division demultiplexer 550.

In some embodiments, as shown in FIG. 18, the first cavity body 520 further includes a second groove 502C and a third groove 502D. The second groove 502C and the third groove 502D each are disposed on the base 5201, and the second groove 502C and the third groove 502D each are recessed towards the bottom of the base 5201. The second groove 502C is located on a side of the second mounting post 502 proximate to the first wavelength division demultiplexer 540, and the second groove 502C is disposed adjacent to the third mounting surface 502A. The third groove 502D is located on a side of the second mounting post 502 proximate to the second wavelength division demultiplexer 550, and the third groove 502D is disposed adjacent to the fourth mounting surface 502B.

In this way, by providing the second groove 502C and the third groove 502D, it is convenient to process the third mounting surface 502A and the fourth mounting surface 502B.

For example, by providing the second groove 502C and the third groove 502D, it is convenient to achieve a tool retraction of a turning tool when the third mounting surface 502A and the fourth mounting surface 502B are processed by a turning process. Moreover, by providing the second groove 502C and the third groove 502D, it is possible to avoid an arc chamfer at a connecting position between the third mounting surface 502A and the base 5201 and an arc chamfer at a connecting position between the fourth mounting surface 502B and the base 5201, so that the first wavelength division demultiplexer 540 and the second wavelength division demultiplexer 550 may be closely contacted with the third mounting surface 502A and the fourth mounting surface 502B, respectively, so as to improve the installation accuracy of the first wavelength division demultiplexer 540 and the second wavelength division demultiplexer 550. In addition, when the first wavelength division demultiplexer 540 and the second wavelength division demultiplexer 550 are connected with the second mounting post 502 through glue dispensing, excess glue may flow into the second groove 502C and the third groove 502D, so as to prevent the glue from affecting the installation accuracy of the first wavelength division demultiplexer 540 and the second wavelength division demultiplexer 550.

In some embodiments, as shown in FIG. 17, the first cavity body 520 further includes a fourth groove 528 and a fifth groove 529. The fourth groove 528 and the fifth groove 529 are disposed on the base 5201 and are recessed towards the bottom of the base 5201. The fourth groove 528 and the fifth groove 529 each are used to accommodate the glue used in glue dispensing. The first wavelength division demultiplexer 540 is disposed on a top portion of the fourth groove 528, and the second wavelength division demultiplexer 550 is disposed on a top portion of the fifth groove 529.

For example, when the first wavelength division demultiplexer 540 and the second wavelength division demultiplexer 550 are being fixed, the glue is dropped into the fourth groove 528 and the fifth groove 529, and then the first wavelength division demultiplexer 540 and the second wavelength division demultiplexer 550 are placed at the top portions of the fourth groove 528 and the fifth groove 529 respectively. In this way, the first wavelength division demultiplexer 540 and the second wavelength division demultiplexer 550 may be fixed on the base 5201 after the glue is solidified.

In some embodiments, as shown in FIG. 18, the fourth groove 528 includes a first glue accommodating groove 528A, a first overflow glue accommodating groove 528B, and a first blocking wall 528C. The first blocking wall 528C is disposed between the first glue accommodating groove 528A and the first overflow glue accommodating groove 528B, so that the first glue accommodating groove 528A and the first overflow glue accommodating groove 528B are spaced apart. For example, the first glue accommodating groove 528A is in a shape of a circle, and the first overflow glue accommodating groove 528B is in a shape of a circular ring and is disposed around the first glue accommodating groove 528A. However, the present disclosure is not limited thereto.

During a process of fixing the first wavelength division demultiplexer 540, the glue is dropped into the first glue accommodating groove 528A, and the glue overflows from the first glue accommodating groove 528A, so as to avoid affecting the installation firmness of the first wavelength division demultiplexer 540 due to insufficient glue. Then, the first wavelength division demultiplexer 540 covers the first glue accommodating groove 528A, and the excess glue in the first glue accommodating groove 528A overflows into the first overflow glue accommodating groove 528B, so as to prevent the glue from overflowing the fourth groove 528 to affect the installation accuracy of the first wavelength division demultiplexer 540.

Similarly, in some embodiments, as shown in FIG. 18, the fifth groove 529 includes a second glue accommodating groove 529A, a second overflow glue accommodating groove 529B, and a second blocking wall 529C. The second blocking wall 529C is disposed between the second glue accommodating groove 529A and the second overflow glue accommodating groove 529B, so that the second glue accommodating groove 529A and the second overflow glue accommodating groove 529B are spaced apart. For example, the second glue accommodating groove 529A is in a shape of a circle, the second overflow glue accommodating groove 529B is in a shape of a circular ring, and the second overflow glue accommodating groove 529B is disposed around the second glue accommodating groove 529A. However, the present disclosure is not limited thereto.

A function of the fifth groove 529 is similar to that of the fourth groove 528, and details will not be repeated herein.

In some embodiments, as shown in FIGS. 10 and 17, the first cavity body 520 further includes a third mounting post 503A, a fourth mounting post 503B, and a fifth mounting post 503C. The third mounting post 503A, the fourth mounting post 503B, and the fifth mounting post 503C are disposed on the base 5201, and the third mounting post 503A, the fourth mounting post 503B, and the fifth mounting post 503C are arranged at intervals in the width direction of the first cavity body 520. The first reflecting prism 561 is disposed between the third mounting post 503A and the fourth mounting post 503B, and the second reflecting prism 571 is disposed between the fourth mounting post 503B and the fifth mounting post 503C.

In this way, the first reflecting prism 561 may be fixed and limited by the third mounting post 503A and the fourth mounting post 503B, and the second reflecting prism 571 may be fixed and limited by the fourth mounting post 503B and the fifth mounting post 503C. In addition, a portion of a surface of the base 5201 between the third mounting post 503A and the fourth mounting post 503B forms a fifth mounting surface 503D, so as to support the first reflecting prism 561; and a portion of a surface of the base 5201 between the fourth mounting post 503B and the fifth mounting post 503C forms a sixth mounting surface 503E, so as to support the second reflecting prism 571.

In some embodiments, as shown in FIG. 17, the base 5201 of the first cavity body 520 includes a first support surface 501A and a second support surface 501B. The first support surface 501A is a first portion of a surface (e.g., the top surface) of the base 5201 proximate to the first cover plate 504, and the second support surface 501B is a second portion of the top surface of the base 5201 proximate to the first cover plate 504. The first support surface 501A is farther away from the circuit board 300 than the second support surface 501B, and the first support surface 501A is higher than the second support surface 501B, so as to form a step 501C between the first support surface 501A and the second support surface 501B. The first mounting post 527, the second mounting post 502, the third mounting post 503A, the fourth mounting post 503B, the fifth mounting post 503C, the first reflecting prism 561, and the second reflecting prism 571 each are disposed on the first support surface 501A. The second support surface 501B is configured to support the flexible circuit board 310 or the electrical connecting member extending into the first cavity body 520.

Therefore, by providing the step 501C, it is possible to divide the top surface of base 5201 according to the height. In this way, the first support surface 501A may raise heights of the fifth mounting surface 503D and the sixth mounting surface 503E, so as to raise heights of the first reflecting prism 561 and the second reflecting prism 571, which facilitates the installation of the first reflecting prism 561 and the first light receiving component 580 and the installation of the second reflecting prism 571 and the second light receiving component 590. In addition, the step 501C may also limit the flexible circuit board 310 extending into the first cavity body 520.

Figure 19:
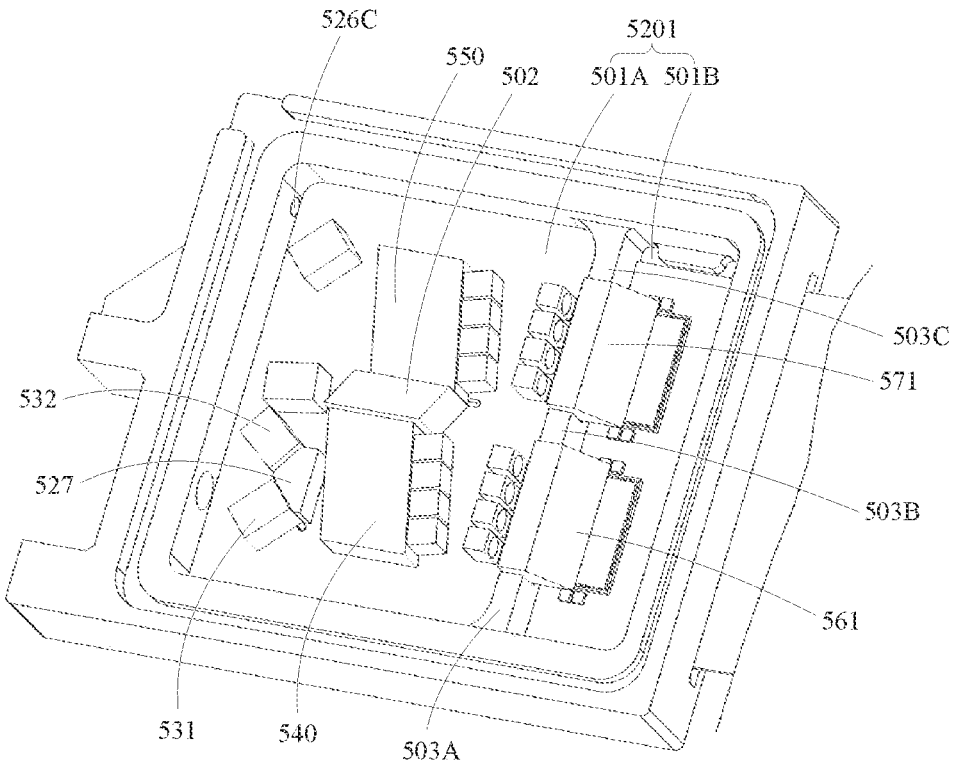
FIG. 19 is a diagram showing a structure of a light receiving assembly without a first cover plate and a displacement component, in accordance with some embodiments.

FIG. 19 is a diagram showing a structure of a light receiving assembly without a first cover plate and a displacement component, in accordance with some embodiments. FIG. 19 shows the first mounting post 527, the second mounting post 502, the fourth groove 528, and the fifth groove 529 in use.

As shown in FIGS. 18 and 19, a side of the first lens 531 is attached to the first mounting surface 527A of the first mounting post 527, and a side of the second lens 532 is attached to the second mounting surface 527B of the first mounting post 527. A side of the first wavelength division demultiplexer 540 is attached to the third mounting surface 502A of the second mounting post 502, and the first wavelength division demultiplexer 540 covers the fourth groove 528. A side of the second wavelength division demultiplexer 550 is attached to the fourth mounting surface 502B of the second mounting post 502, and the second wavelength division demultiplexer 550 covers the fifth groove 529. The first reflecting prism 561 is disposed between the third mounting post 503A and the fourth mounting post 503B, and the second reflecting prism 571 is disposed between the fourth mounting post 503B and the fifth mounting post 503C.

Figure 20:
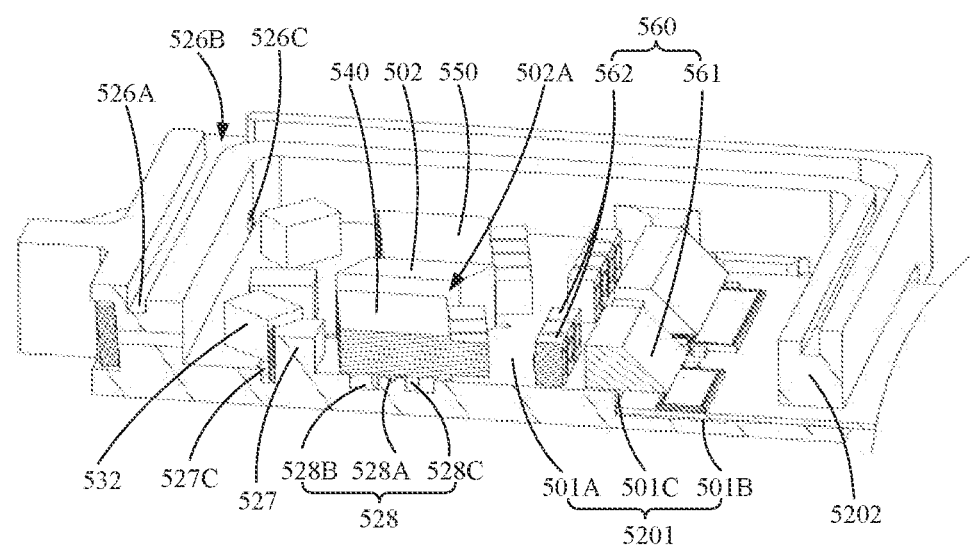
FIG. 20 is a sectional view of the light receiving assembly in FIG. 19.

FIG. 20 is a sectional view of the light receiving assembly in FIG. 19.

For example, as shown in FIG. 20, in a case where the side of the second lens 532 is attached to the second mounting surface 527B of the first mounting post 527, the second lens 532 covers a portion of the first groove 527C. In a case where the first wavelength division demultiplexer 540 is mounted on the base 5201, the first wavelength division demultiplexer 540 covers the first glue accommodating groove 528A and the first overflow glue accommodating groove 528B. The first support surface 501A raises a height in which the first wavelength division demultiplexer 540 is located, so that there is a certain height difference between a surface (e.g., the bottom surface) of the first wavelength division demultiplexer 540 proximate to the base 5201 and the second support surface 501B, so as to facilitate installing the first light receiving component 580 on the first support surface 501A. An end of the flexible circuit board 310 away from the circuit board 300 abuts against the step 501C. In addition, a portion of the flexible circuit board 310 extending into the first cavity body 520 may be fixed on the second support surface 501B through thermal conductive adhesive.

In some embodiments, as shown in FIG. 20, the first cavity body 520 further includes a second connecting groove 526A. The second connecting groove 526A is disposed at an end (e.g., the top end) of the side wall 5202 away from the base 5201 and is recessed towards the base 5201. The glue may be filled in the second connecting groove 526A, so that the first cover plate 504 may be fixedly connected with the first cavity body 520.

In some embodiments, the second connecting groove 526A is in a shape of a closed ring, so as to increase an area of a region between the first cover plate 504 and the side wall 5202 for bonding, thereby improving the reliability of encapsulation of the first cover plate 504 and the first cavity body 520.

In some embodiments, as shown in FIG. 20, the first cavity body 520 further includes a repair opening 526B. The repair opening 526B is disposed at the top end of the side wall 5202 and is located at an edge of the top end of the side wall 5202. The repair opening 526B communicates with the second connecting groove 526A. In a case where the components inside the first cavity body 520 need to be repaired after the first cover plate 504 and the first cavity body 520 are encapsulated, the first cover plate 504 may be disassembled from the first cavity body 520 through the repair opening 526B. In this way, the first cover plate 504 may be removed without damaging the first cover plate 504 or the first cavity body 520, so as to reduce the difficulty and cost of maintenance of the optical module 200.

Figure 21:
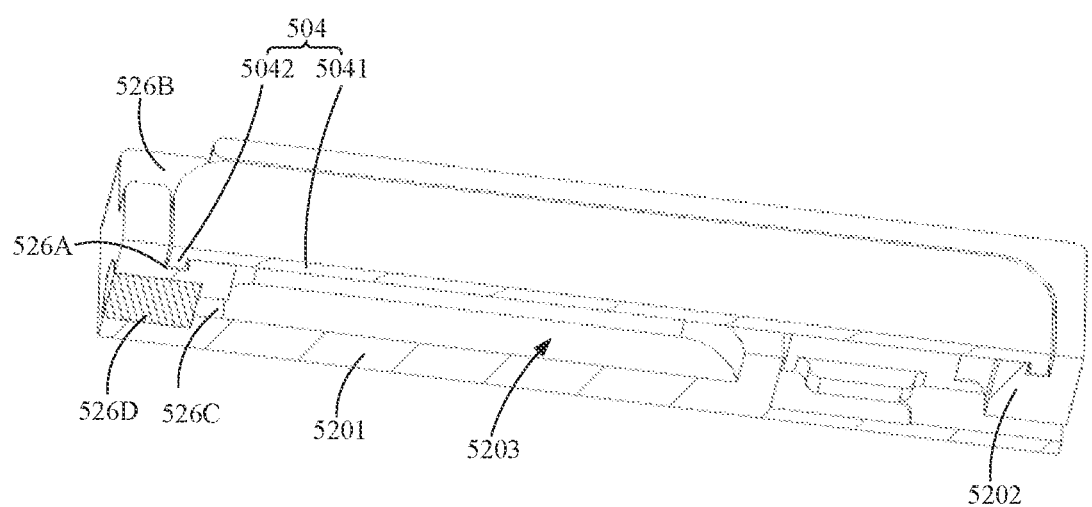
FIG. 21 is a sectional view of a first cavity body and a first cover plate, in accordance with some embodiments.

FIG. 21 is a sectional view of a first cavity body and a first cover plate, in accordance with some embodiments.

In some embodiments, as shown in FIG. 21, the first cover plate 504 includes a cover plate body 5041 and a second protrusion 5042. The second protrusion 5042 is disposed on an edge of the cover plate body 5041 and protrudes towards a direction proximate to the base 5201. The second protrusion 5042 matches the second connecting groove 526A. In this way, in a case where the first cavity body 520 is fixedly connected with the first cover plate 504 through the glue, the second connecting groove 526A matches with the second protrusion 5042, so as to increase the bonding area between the glue and the first cover plate 504, so as to improve the reliability of sealing the first cover plate 504 and the first cavity body 520.

In some embodiments, as shown in FIG. 21, the first cavity body 520 further includes a third via hole 526C and a sealing plug 526D. The third via hole 526C is disposed in the side wall 5202 of the first cavity body 520 proximate to the first fiber optic adapter 510, and the third via hole 526C communicates with the cavity 5203. The sealing plug 526D is configured to close the third via hole 526C. Since the first cavity body 520 needs to be heated and baked during the manufacturing process of the light receiving assembly 500. It is possible to facilitate the air circulation in the cavity 5203 of the first cavity body 520 through the third via hole 526C. After the first cavity body 520 is heated and baked, by using the sealing plug 526D to seal the third via hole 526C, it is possible to prevent the air outside the first cavity body 520 from entering the cavity 5203 of the first cavity body 520 through the third via hole 526C.

A person skilled in the art will understand that the scope of disclosure in the present disclosure is not limited to specific embodiments discussed above, and may modify and substitute some elements of the embodiments without departing from the spirits of this application. The scope of the application is limited by the appended claims.

What is claimed is:

1. An optical module, comprising:
a shell;
a circuit board disposed in the shell;
a light receiving assembly disposed in the shell and electrically connected with the circuit board, the light receiving assembly being configured to convert received optical signals into electrical signals; and
a first fiber optic adapter connected with the light receiving assembly, the first fiber optic adapter being configured to transmit optical signals from an outside of the optical module to the light receiving assembly; wherein
the light receiving assembly includes:
a first cavity body connected with the first fiber optic adapter;
a first lens group disposed in the first cavity body, the first lens group being configured to split the optical signals transmitted by the first fiber optic adapter to the first cavity body for a first time according to a wavelength, so as to obtain a first optical signal beam and a second optical signal beam;
a plurality of wavelength division demultiplexers disposed in the first cavity body, the plurality of wavelength division demultiplexers including:
a first wavelength division demultiplexer configured to receive the first optical signal beam and split the first optical signal beam for a second time according to a wavelength; and
a second wavelength division demultiplexer configured to receive the second optical signal beam and split the second optical signal beam for a second time according to a wavelength; and
at least one light receiving component disposed in the first cavity body, the light receiving component including a plurality of light receiving chips, and the plurality of light receiving chips being configured to receive the optical signals split for the second time by the plurality of wavelength division demultiplexers and convert the optical signals into the electrical signals;
wherein the first cavity body includes:
a base, the base including:
a first support surface, the first lens group and the plurality of wavelength division demultiplexers being disposed on the first support surface; and
a second support surface, the light receiving component being disposed on the second support surface, the first support surface being farther from the circuit board than the second support surface, and the first support surface being higher than the second support surface, so as to provide a step between the first support surface and the second support surface;
a side wall disposed around the base;
a cavity defined by the base and the side wall; and
a first via hole disposed on the side wall and communicating with the cavity, the first fiber optic adapter being connected with the first cavity body through the first via hole.

2. The optical module according to claim 1, wherein the first lens group includes:

a first lens configured to reflect the optical signals transmitted by the first fiber optic adapter to the first cavity body, so as to change a propagation direction of the optical signals;
a second lens configured to receive and transmit the optical signals reflected by the first lens, and reflect the first optical signal beam from a third lens to the first wavelength division demultiplexer;
the third lens configured to receive the optical signals transmitted by the second lens, reflect the first optical signal beam, and transmit the second optical signal beam, so as to split the optical signals for the first time; and
a fourth lens configured to reflect the second optical signal beam to the second wavelength division demultiplexer;
wherein the first lens, the second lens, the third lens, and the fourth lens are sequentially arranged in a width direction of the first cavity body.

3. The optical module according to claim 2, wherein the first cavity body further includes:

a first mounting post disposed on the base, the first mounting post including a first mounting surface and a second mounting surface, and a preset included angle being provided between the first mounting surface and the second mounting surface, the first lens being connected with the first mounting surface, and the second lens being connected with the second mounting surface; and
a second mounting post disposed on the base, the second mounting post including a third mounting surface and a fourth mounting surface disposed opposite to each other, the first wavelength division demultiplexer being connected with the third mounting surface, and the second wavelength division demultiplexer being connected with the fourth mounting surface.

4. The optical module according to claim 3, wherein the first cavity body further includes:

a first groove disposed on the base and recessed towards a bottom of the base, the first groove being located outside the first mounting post and disposed adjacent to the first mounting surface and the second mounting surface;
a second groove disposed on the base and recessed towards the bottom of the base, the second groove being located on a side of the second mounting post proximate to the first wavelength division demultiplexer, and disposed adjacent to the third mounting surface; and
a third groove disposed on the base and recessed towards the bottom of the base, the third groove being located on a side of the second mounting post proximate to the second wavelength division demultiplexer, and disposed adjacent to the fourth mounting surface.

5. The optical module according to claim 1, wherein the first cavity body further includes:

a fourth groove disposed on the base and recessed towards a bottom of the base, the first wavelength division demultiplexer being disposed above the fourth groove, and the fourth groove including:
a first glue accommodating groove;
a first overflow glue accommodating groove disposed around the first glue accommodating groove; and
a first blocking wall disposed between the first glue accommodating groove and the first overflow glue accommodating groove, so that the first glue accommodating groove and the first overflow glue accommodating groove are spaced apart; and a fifth groove disposed on the base and recessed towards the bottom of the base, the second wavelength division demultiplexer being disposed above the fifth groove, and the fifth groove including:
- a second glue accommodating groove;
- a second overflow glue accommodating groove disposed around the second glue accommodating groove; and
- a second blocking wall disposed between the second glue accommodating groove and the second overflow glue accommodating groove, so that the second glue accommodating groove and the second overflow glue accommodating groove are spaced apart.

6. The optical module according to claim 1, wherein the first lens group includes:
- a first lens configured to reflect the optical signals transmitted by the first fiber optic adapter to the first cavity body, so as to change a propagation direction of the optical signals;
- an optical filter configured to receive the optical signals reflected by the first lens, reflect the first optical signal beam, and transmit the second optical signal beam;
- a fourth lens configured to reflect the second optical signal beam to the second wavelength division demultiplexer; and
- a fifth lens configured to reflect the first optical signal beam to the first wavelength division demultiplexer.

7. The optical module according to claim 1, wherein the at least one light receiving component includes:
- a first light receiving component including a plurality of first light receiving chips; and
- a second light receiving component including a plurality of second light receiving chips; the plurality of light receiving chips including the plurality of first light receiving chips and the plurality of second light receiving chips; and the light receiving assembly further includes:
- a second lens assembly including a first reflecting prism, the first reflecting prism being disposed on the first support surface, a projection of the first reflecting prism on the base covering the first light receiving chips, and the first reflecting prism being configured to reflect the optical signals split for the second time by the first wavelength division demultiplexer to the first light receiving chips; and
- a third lens assembly including a second reflecting prism, the second reflecting prism being disposed on the first supporting surface, a projection of the second reflecting prism on the base covering the second light receiving chips, and the second reflecting prism being configured to reflect the optical signals split for the second time by the second wavelength division demultiplexer to the second light receiving chips.

8. The optical module according to claim 7, wherein the first light receiving component further includes:
- a first substrate, the first light receiving chips being disposed on the first substrate; and
- a first transimpedance amplifier disposed on a side of the first substrate proximate to the circuit board, electrodes of the first light receiving chips and pins of the first transimpedance amplifier being located at a same height; and the second light receiving component further includes:
- a second substrate, the second light receiving chips being disposed on the second substrate; and
- a second transimpedance amplifier disposed on a side of the second substrate proximate to the circuit board, electrodes of the second light receiving chips and pins of the second transimpedance amplifier being located at a same height.

9. The optical module according to claim 7, wherein the first cavity body further includes:
- a third mounting post;
- a fourth mounting post, the first reflecting prism being disposed between the third mounting post and the fourth mounting post, and the first reflecting prism being connected with the third mounting post and the fourth mounting post; and
- a fifth mounting post, the second reflecting prism being disposed between the fourth mounting post and the fifth mounting post, and the second reflecting prism being connected with the fourth mounting post and the fifth mounting post;
- wherein the third mounting post, the fourth mounting post, and the fifth mounting post are disposed on the first support surface and arranged at intervals in a width direction of the first cavity body.

10. The optical module according to claim 1, wherein the first cavity body further includes a first opening, the first opening being disposed on the side wall and proximate to the circuit board, and the first opening penetrating the side wall and communicating with the cavity; wherein the optical module further satisfies one of the following:
- the optical module further comprises a flexible circuit board, the flexible circuit board being electrically connected with the light receiving component through the first opening, an end of the flexible circuit board abutting against the step, and another end of the flexible circuit board being electrically connected with the circuit board;

or,

- the optical module further comprises an electrical connecting member, the electrical connecting member being electrically connected with the light receiving component through the first opening, the light receiving component being disposed on the electrical connecting member, and the electrical connecting member being electrically connected with the circuit board through a flexible circuit board.

11. The optical module according to claim 1, wherein the light receiving assembly further includes a flat lens, and the flat lens is disposed in the first via hole and disposed obliquely with respect to a central axis of the first via hole.

12. The optical module according to claim 11, wherein an included angle between an optic axis of the flat lens and the central axis of the first via hole satisfies a preset threshold, and the preset threshold is any value within a range of 4° to 6° inclusive.

13. The optical module according to claim 1, further comprising:
- a light emitting assembly disposed in the shell and electrically connected with the circuit board, the light emitting assembly and the light receiving assembly being arranged in a stack, and the light emitting assembly being configured to emit optical signals; and
- a second fiber optic adapter connected with the light emitting assembly, the second fiber optic adapter and the first fiber optic adapter being located at a same height, and the second fiber optic adapter being configured to transmit the optical signals from the light emitting assembly to an outside of the optical module;
- wherein the light receiving assembly further includes a displacement component, the displacement component being connected with the first fiber optic adapter and the first cavity body, and the displacement component being configured to adjust an optical path height of the optical signals transmitted by the first fiber optic adapter in a height direction of the optical module.

14. The optical module according to claim 13, wherein the displacement component includes:
   a prism cavity body connected with the first fiber optic adapter and the first cavity body, the prism cavity body including a prism accommodating cavity, the first fiber optic adapter communicating with the prism cavity body through the prism accommodating cavity, and the prism accommodating cavity communicating with the first via hole; and
   a displacement prism disposed in the prism accommodating cavity, the displacement prism being configured to adjust the optical path height of the optical signals transmitted by the first fiber optic adapter in the height direction of the optical module.

15. The optical module according to claim 14, wherein a side of the prism accommodating cavity proximate to the first cavity body is open, so as to constitute a second opening; and
   wherein the displacement component further includes a second cover plate, the second cover plate covering the prism cavity body, so as to close a portion of the second opening, an exposed portion of the second opening constituting a second via hole, and the second via hole communicating with the first via hole.

16. The optical module according to claim 14, wherein the displacement component further includes:
   a connecting hole disposed on a side of the prism cavity body proximate to the first fiber optic adapter and communicating with the prism accommodating cavity, the connecting hole including:
      a counterbore; and
      a connecting sub-hole communicating with the prism accommodating cavity and the counterbore, and the counterbore being closer to the first fiber optic adapter than the connecting sub-hole;
   a first connecting groove disposed on a bottom wall of the counterbore and proximate to an inner wall of the counterbore; and
   a first protrusion, the first connecting groove being recessed in a direction away from the first fiber optic adapter, so as to constitute the first protrusion on the bottom wall of the counterbore; and
   the first fiber optic adapter includes:
      an adapter body; and
      a connector disposed on an end of the adapter body proximate to the displacement component and matched with the connecting hole, an end of the connector proximate to the displacement component abutting against the first protrusion.

17. The optical module according to claim 14, wherein the first cavity body further includes a connecting portion, the connecting portion being disposed on a side of the side wall proximate to the displacement component, and the connecting portion being connected to the prism cavity body, the connecting portion including:
   a first connecting plate; and
   a second connecting plate, the first connecting plate being opposite to the second connecting plate, and the first connecting plate and the second connecting plate being located on two sides of the displacement component respectively, the prism cavity body being clamped between the first connecting plate and the second connecting plate, and sides of the first connecting plate and the second connecting plate proximate to the prism cavity body each being connected with an outer surface of the prism cavity body.

18. The optical module according to claim 17, wherein the connecting portion further satisfies at least one of the following:
   the connecting portion further includes a support structure, the support structure being disposed on a side of the first connecting plate away from the second connecting plate, and the support structure being connected with the first connecting plate and the side wall, so as to support the first connecting plate;
   or
   the connecting portion further includes a support structure, the support structure being disposed on a side of the second connecting plate away from the first connecting plate, and the support structure being connected with the second connecting plate and the side wall, so as to support the second connecting plate.

19. The optical module according to claim 14, wherein the displacement prism includes:
   a third reflecting surface; and
   a fourth reflecting surface, the third reflecting surface being parallel to the fourth reflecting surface, and the third reflecting surface being configured to reflect the optical signals transmitted by the first fiber optic adapter to the fourth reflecting surface, and the fourth reflecting surface being configured to reflect the optical signals reflected by the third reflecting surface to the first via hole.

* * * * *